(12) United States Patent
Christmann et al.

(10) Patent No.: US 11,899,287 B2
(45) Date of Patent: Feb. 13, 2024

(54) METHOD OF MANUFACTURING A SPECTACLE LENS

(71) Applicant: Carl Zeiss Vision International GmbH, Aalen (DE)

(72) Inventors: Michel-René Christmann, Aalen (DE); Waiz Karim, Ellwangen (DE); Andreu Llobera Adan, Cerdanyola del Vallès (ES); Yujing Liu, Aalen (DE); Christian Lischer, Aalen (DE); Maximilian Kastner, Aalen (DE)

(73) Assignee: Carl Zeiss Vision International GmbH, Aalen (DE)

( * ) Notice: Subject to any disclaimer, the term of this patent is extended or adjusted under 35 U.S.C. 154(b) by 0 days.

(21) Appl. No.: 18/304,458

(22) Filed: Apr. 21, 2023

(65) Prior Publication Data
US 2023/0341706 A1 Oct. 26, 2023

Related U.S. Application Data

(63) Continuation of application No. PCT/EP2021/079530, filed on Oct. 25, 2021.

(30) Foreign Application Priority Data

Oct. 23, 2020 (EP) .................................... 20203727

(51) Int. Cl.
*G02C 7/02* (2006.01)
*G02B 1/14* (2015.01)
(Continued)

(52) U.S. Cl.
CPC ................ *G02C 7/022* (2013.01); *G02B 1/11* (2013.01); *G02B 1/12* (2013.01); *G02B 1/14* (2015.01); *G02C 2202/14* (2013.01)

(58) Field of Classification Search
CPC ...... G02C 7/022; G02C 2202/14; G02B 1/11; G02B 1/12; G02B 1/14
(Continued)

(56) References Cited

U.S. PATENT DOCUMENTS 5,316,791 A 5/1994 Farber et al.
10,670,884 B2 * 6/2020 Glöge .................... G02C 7/022
(Continued)

FOREIGN PATENT DOCUMENTS

EP 1433814 A1 6/2004
EP 1561571 A1 8/2005
(Continued)

OTHER PUBLICATIONS

B. A. Holden et al., "Global Vision Impairment Due to Uncorrected Presbyopia," Arch. Ophthalmol., vol. 126, No. 12, pp. 1731-1739, Dec. 2008.
(Continued)

*Primary Examiner* — William R Alexander
(74) *Attorney, Agent, or Firm* — Tautz & Schuhmacher LLC; Georg M. Hasselmann

(57) ABSTRACT

A method of manufacturing a spectacle lens having a lens substrate a lens substrate and at least one coating is disclosed. The method includes at least the following steps in the given order: providing a lens substrate having an uncoated or pre-coated front surface and an uncoated or pre-coated back surface, coating at least one surface with at least one coating, the surface of the at least one coating being modifiable when contacted with at least one medium being able to modify the surface of the coating, completely or partially contacting the surface of the coating with the at least one medium, applying at least one single electromagnetic pulse to at least one of the surfaces of the spectacle lens having the lens substrate, the coating and the medium and
(Continued)

Example 8

Example 9

Example 10 obtaining the spectacle lens having the at least one coating with a completely or partially modified surface.

17 Claims, 1 Drawing Sheet

(51) Int. Cl.
 *G02B 1/12* (2006.01)
 *G02B 1/11* (2015.01)
(58) Field of Classification Search
 USPC .................................................. 351/159.01
 See application file for complete search history.

(56) References Cited

U.S. PATENT DOCUMENTS

| | | | | |
|---|---|---|---|---|
| 10,845,619 | B2* | 11/2020 | Mappes | B29D 11/00028 |
| 11,175,517 | B2* | 11/2021 | Mappes | B33Y 80/00 |
| 11,614,640 | B2* | 3/2023 | Mappes | B29D 11/00432 |
| | | | | 351/158 |
| 11,633,928 | B2* | 4/2023 | Mappes | B29D 11/00355 |
| | | | | 351/159.48 |
| 2002/0111390 | A1 | 8/2002 | Lin et al. | |
| 2002/0158354 | A1 | 10/2002 | Foreman et al. | |
| 2005/0171231 | A1 | 8/2005 | Diggins | |
| 2009/0189303 | A1 | 7/2009 | Diggins et al. | |
| 2010/0039613 | A1 | 2/2010 | Sharma et al. | |
| 2012/0267045 | A1 | 10/2012 | Honda | |
| 2014/0099439 | A1 | 4/2014 | Okubo et al. | |
| 2015/0160477 | A1 | 6/2015 | Dai | |
| 2017/0013167 | A1 | 1/2017 | Saga | |
| 2017/0131567 | A1 | 5/2017 | To et al. | |
| 2019/0212580 | A1 | 7/2019 | To et al. | |
| 2019/0310492 | A1 | 10/2019 | Gromotka | |
| 2019/0353925 | A1 | 11/2019 | Biskop et al. | |
| 2020/0159044 | A1 | 5/2020 | To et al. | |
| 2021/0124189 | A1* | 4/2021 | Hugenberg | B29D 11/00865 |
| 2023/0161081 | A1* | 5/2023 | Aziz | B29D 11/00009 |
| | | | | 351/159.01 |
| 2023/0265010 | A1* | 8/2023 | Christmann | B29D 11/00326 |
| | | | | 427/492 |

FOREIGN PATENT DOCUMENTS

| | | |
|---|---|---|
| EP | 1602479 A1 | 12/2005 |
| EP | 2578649 A1 | 4/2013 |
| EP | 2682807 A1 | 1/2014 |
| EP | 3339940 A1 | 6/2018 |
| EP | 3531195 A1 | 8/2019 |
| EP | 3812142 A1 | 4/2021 |
| EP | 3928966 A1 | 12/2021 |
| JP | 2010-513953 A | 4/2010 |
| JP | 2012-128173 A | 7/2012 |
| JP | 2012-194547 A | 10/2012 |
| WO | 9739880 A2 | 10/1997 |
| WO | 9906887 A1 | 2/1999 |
| WO | 0018569 A2 | 4/2000 |
| WO | 0056527 A1 | 9/2000 |
| WO | 0194104 A2 | 12/2001 |
| WO | 03058300 A1 | 7/2003 |
| WO | 03078145 A2 | 9/2003 |
| WO | 2006034652 A1 | 4/2006 |
| WO | 2006135390 A2 | 12/2006 |
| WO | 2007066006 A2 | 6/2007 |
| WO | 2007066006 A2 | 7/2007 |
| WO | 2008049503 A2 | 5/2008 |
| WO | 2010075319 A1 | 7/2010 |
| WO | 2018026697 A1 | 2/2018 |
| WO | 2019166653 A1 | 9/2019 |
| WO | 2019166654 A1 | 9/2019 |
| WO | 2019166655 A1 | 9/2019 |
| WO | 2019166657 A1 | 9/2019 |
| WO | 2019166659 A1 | 9/2019 |
| WO | 2019206569 A1 | 10/2019 |
| WO | 2020078964 A1 | 4/2020 |

OTHER PUBLICATIONS

World Health Organization (WHO), "Universal eye health: a global action plan 2014-2019", pp. 1-22, 2013.
C. S. Y. Lam et al., "Defocus Incorporated Multiple Segments (DIMS) spectacle lenses slow myopia progression: a 2-year randomised clinical trial," Br J Ophthalmol., vol. 104, No. 3, pp. 363-368, May 2019.
Industrial Norm "Ophthalmic optics—Spectacle lenses—Vocabulary (ISO 13666:2019)," English version EN ISO ISO 13666:2019, Dec. 2019.
K. G. Foote et al.,|Ultra-widefield peripheral refraction using a slit-scanning ophthalmoscope and image montaging|, Investigative Ophthalmology & Visual Science, vol. 61, Jul. 2020.
European Search Report issued in 20 203 727.1, to which this application claims priority, dated Apr. 29, 2021.
International Search Report and Written Opinion issued in PCT/EP2021/079530, to which this application claims priority, dated Jan. 21, 2022.
International Preliminary Report on Patentability issued in PCT/EP2021/079530, to which this application claims priority, dated Jan. 18, 2023.
U.S. Appl. No. 18/304,451, filed Apr. 21, 2023, Maximilian Kastner, Michel-René Christmann, Andreu Llobera Adan.
U.S. Appl. No. 18/304,464, filed Apr. 21, 2023, Michel-René Christmann, Andreu Llobera Adan, Gerhard Kelch.
Office Action by the Japanese Patent Office issued in JP 2023-524759, which is a counterpart hereof, dated Sep. 19, 2023, and English-language machine translation thereof.

* cited by examiner

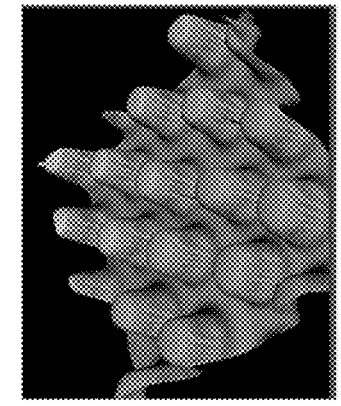
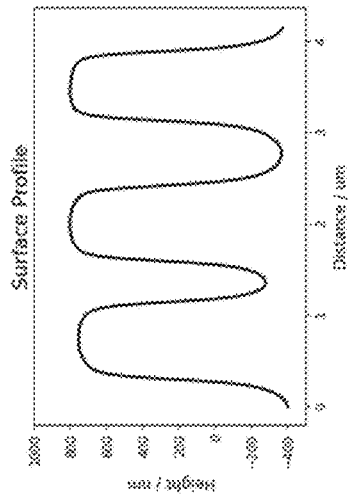
Example 8
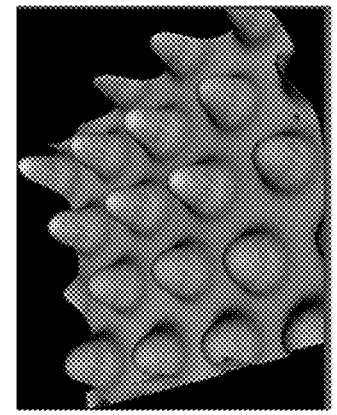
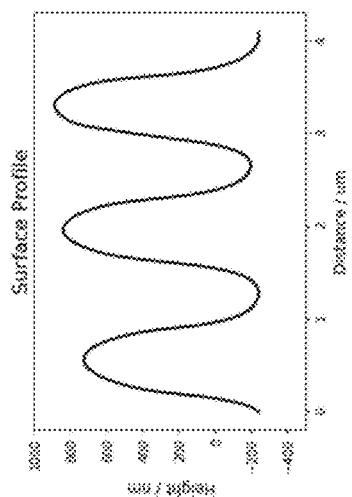
Example 9
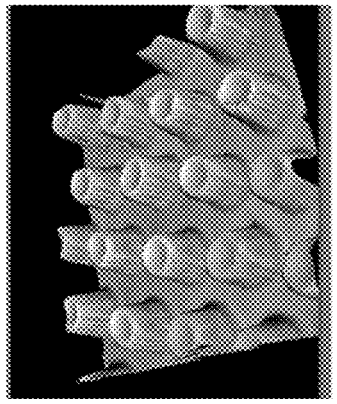
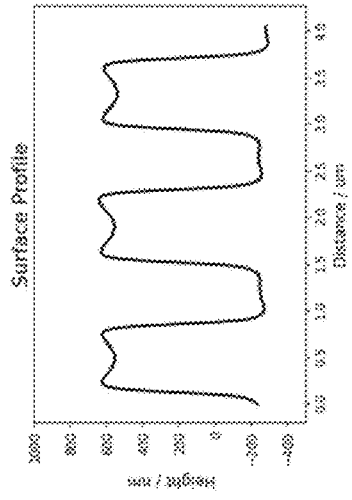
Example 10

METHOD OF MANUFACTURING A SPECTACLE LENS

CROSS REFERENCE TO RELATED APPLICATIONS

This application is a continuation application of international patent application PCT/EP2021/079530, filed on Oct. 25, 2021 and designating the U.S., which claims priority to European patent application EP 20 203 727.1, filed on Oct. 23, 2020, both of which are hereby incorporated by reference in their entireties.

TECHNICAL FIELD

The disclosure relates to a method of manufacturing a spectacle lens.

BACKGROUND

According to Brien A. Holden et al., "Global Vision Impairment Due to Uncorrected Presbyopia," Arch Ophthalmol. 2008; 126(12):1731-1739, uncorrected distance refractive error is the most common cause of vision impairment. In "Universal eye health: a global action plan 2014-2019," World Health Organization 2013, the WHO estimates that in 2010 285 million people were visually impaired. C. S. Y. Lam et al., "Defocus Incorporated Multiple Segments (DIMS) spectacle lenses slow myopia progression: a 2-year randomised clinical trial," Br J Ophthalmol 2019; 0:1-6, tested in a study with children Defocus Incorporated Multiple Segments (DIMS) spectacle lenses, also disclosed for example in U.S. 2017/0131567 A1, U.S. 2019/0212580 A1, or U.S. 2020/0159044 A1, which should impose myopic defocus. The DIMS spectacle lenses were shown to retard myopia progression and axial elongation in myopic children.

U.S. 2017/0131567 A1 discloses a spectacle lens comprising a first refraction area having a first refractive power based on a prescription for correcting an abnormal refraction of an eye and second refraction areas having the function of focusing an image on a position other than the retina of the eye to suppress a progress of the abnormal refraction of the eye. The second refraction areas are formed as a plurality of independent island-shaped areas.

U.S. 2019/0212580 A1 discloses a spectacle lens comprising a first refraction area and second refraction areas as disclosed in U.S. 2017/013167 A1. The second refraction areas according to U.S. 2019/0212580 A1 are dispersedly arranged as a plurality of mutually separate areas, each of these second refraction areas being surrounded by the first refraction area.

U.S. 2020/0159044 A1 discloses a first spectacle lens comprising a first refraction area having a refractive power based on a prescription for correcting myopia and second refraction areas having a refractive power different from the first refractive power. Each of the second refraction areas is formed into a convex shape that extends from an object side surface of the spectacle lens. Each of the second refraction areas has a larger curvature than the object side surface of the first refraction area. The second refraction areas comprise a plurality of refraction areas having a plurality of refractive powers different from each other. U.S. 2020/0159044 A1 further discloses a second spectacle lens comprising a first refraction area based on a prescription for correcting myopia and second refraction areas having a refractive power different from the first refractive power. The second refraction areas of the second spectacle lens are non-concentrically formed as a plurality of island-shaped areas, the refractive power of the second refraction areas is larger than the first refractive power of the first refraction area by 2.00 D to 5.00 D. U.S. 2020/0159044 A1 further discloses a third spectacle lens comprising a first refraction area having a first refractive power based on a prescription for correcting an abnormal refraction of an eye and second refraction areas having a refractive power different from the first refractive power. The second refraction areas of the third spectacle lens are non-concentrically formed as a plurality of island-shaped areas arranged to form a hexagon inscribed in a circle having a predetermined radius.

U.S. 2015/0160477 A1 discloses a multi-element lens for controlling defocus and eye diopter dividing the lens into a lens area corresponding to the central view region of the eye and a convex lens area corresponding to the equatorial view region of the eye. The multi-element lens comprises a large unit convex lens generating a large defocus, a small unit concave lens generating small defocus or focus through combination on the large unit convex lens, or a small single lens generating small defocus is separately provided on the large unit convex lens. The junction between the large unit concave lens and the small unit concave lens or the small single lens is a gradual zoom structure or step zoom structure. U.S. 2015/0160477 A1 also discloses on the large unit convex lens a subunit concave lens or a medium single lens, each combination generating medium defocus through combination with the lens of the large unit convex lens. The subunit concave lens or the medium single lens is disposed on the outer ring of the small unit concave lens or the small single lens and is ring-like.

WO 2018/026697 A1 discloses ophthalmic lenses for treating myopia. The lenses include a dot pattern distributed across each lens, the dot pattern including an array of dots spaced apart by a distance of 1 mm or less, each dot having a maximum dimension of 0.3 mm or less. The dots may be arranged on a square grid, a hexagonal grid, another grid, or in a semi-random or random pattern. The dots may be spaced at regular intervals or the dot spacing may vary depending on the distance of the dot from the center of the lens. The dot pattern can include a clear aperture free of dots having a maximum dimension of more than 1 mm, the clear aperture being aligned with a viewing axis of a wearer of the pair of glasses. The clear aperture can be substantially circular or a similar shape. The dots may be protrusions or recesses on a surface of the corresponding lens. The protrusions can be formed from a transparent material. For manufacturing the protrusions, discrete portions of a material are deposited, e.g., by using an inkjet printer, on a surface of the lens corresponding to the dot pattern. The discrete portions provide the protrusions after curing, e.g., using radiation. The dot pattern can reduce an image contrast of an object viewed through the dot pattern by at least 30% compared to an image contrast of the object viewed through the clear aperture. According to WO 2018/026697 A1 the pair of eyeglasses is customized for a wearer, inter alia the lenses thereby having optical power to correct the wearer's on-axis vision to 20/20 or better, the lenses including a dot pattern distributed across each lens, the dot pattern including an array of dots arranged so that, for at least a portion of the wearer's peripheral vision, the lenses correct the wearer's vision to 20/25 or better and reduce an image contrast by at least 30% compared to on-axis image contrast.

WO 2006/034652 A1 discloses a method for treating progression of a refractive disorder in a human eye, in particular a method for counteracting the development of myopia by enhancing myopic defocus and a method for counteracting the development of hyperopia by enhancing of hyperopic defocus. The method includes producing a first image on a retina of the human eye and producing a second image to generate a defocus. To alter the defocus equilibrium of the eye should influence axial eye growth in a direction towards emmetropia. This artificial shift may be introduced by a spectacle lens, typically together with the conventional correction so that normal vision can be maintained. The spectacle lens may be a Fresnel lens or a central-peripheral multi-focal lens including concentric optical zones of two or more optical powers.

WO 2010/075319 A2 discloses a therapeutic treatment method for preventing, ameliorating, or reversing eye-length related disorders. Therefor an artificial blurring of the patient's vision is induced in order to decrease an average spatial frequency of images input to the retina of the eye past a threshold spatial frequency to inhibit further lengthening of the eye. For inducing artificial blurring blur-inducing glasses may be used. The blur-inducing glasses induces the burring by small bumps or depressions in one or both surfaces of the lenses, inclusions within the lenses of a material different from the lens material, incorporation of higher-level aberrations in the lenses, including higher-level aberrations that more greatly affect peripheral vision, providing progressive negative corrections in one or both lenses from the top of the lenses to the bottom of the lenses, coatings or films applied to one or both surfaces of the lenses. Decreasing for example the density of bumps or depressions in the central region of the lens facilitates relatively normal image acquisition for portions of scenes axially aligned with the axis of the eye, while increasingly blurring the portions of scenes that are not aligned with the optical axis. The amount of artificial blurring can be controlled by varying for example the density or the dimensions of the bumps or depressions.

WO 2019/166653 A1 discloses a lens element comprising a refraction area having a refractive power based on a prescription for an eye of a person and a plurality of at least three non-contiguous optical elements with at least one optical element having a non-spherical optical function. At least one of the non-contiguous optical elements may be for example a multifocal refractive micro-lens, made of a birefringent material, a diffractive lens or has a shape configured to create a caustic in front of the retina of the eye of the person.

WO 2019/166654 A1 discloses a lens element comprising a refraction area having a first refractive power based on a prescription for correcting an abnormal refraction of an eye of a person, a second refractive power different from the first refractive power and a plurality of at least three optical elements with at least one optical element having an optical function of not focusing an image on the retina of the eye so as to slow down the progression of the abnormal refraction of the eye. The difference between the first refractive power and the second refractive power may be greater or equal to 0.5 D.

WO 2019/166655 A1 discloses a lens element comprising a refraction area having a refractive power based on a prescription for an eye of a person and a plurality of at least three optical elements. The optical elements are configured so that along at least one section of the lens the mean sphere of optical elements increases from a point of the section towards the peripheral part of the section. The optical elements may be configured so that along at least one section of the lens the mean cylinder of the optical elements increases from a point of the section towards the peripheral part of the section.

WO 2019/166657 A1 discloses a lens element comprising a prescription portion configured to provide to a wearer in standard wearing conditions and for foveal vision a first optical power based on the prescription of the wearer for correcting an abnormal refraction of an eye of the wearer and a plurality of at least three optical elements with at least one optical element having an optical function of not focusing an image on the retina of the eye in standard wearing conditions and for peripheral vision so as to slow down the progression of the abnormal refraction of the eye. At least one of the optical elements may have an optical function of focusing an image on a position other than the retina in standard wearing conditions and for peripheral vision.

WO 2019/166659 A1 discloses a lens element comprising a refraction area having a refractive power based on a prescription for an eye of a wearer and a plurality of at least two contiguous optical elements with at least one optical element having an optical function of not focusing an image on the retina of the eye of the wearer so as to slow down the progression of the abnormal refraction of the eye. Having contiguous optical elements improves according to WO 2019/166659 A1 the aestheticism of the lens element and limits the discontinuity degree of the lens element surface. At least two contiguous optical elements may be independent.

WO 2019/206569 A1 discloses a lens element comprising a prescription portion configured to provide to a wearer in standard wearing conditions a first optical function based on the prescription of the wearer for correcting an abnormal refraction of an eye of the wearer and a plurality of contiguous optical elements. Each optical element has a simultaneously bifocal optical function that provides simultaneously a second optical function in standard wearing conditions and a third optical function of not focusing an image on the retina of the eye in the standard wearing conditions so as to slow down the progression of the abnormal refraction of the eye. Having a plurality of contiguous optical elements that provide simultaneously a second and third optical function, allows according to WO 2019/206569 A1 having an easy to configure lens element that reduces the progression of abnormal refraction of the eye such as myopia or hyperopia by having part of the light focused on the retina of the wearer and part of the light focused either in front or behind the retina of the wearer. Further, the lens element allows selecting the part of the light that is to be focused on the retina and the part of the light that is not to be focused on the retina of the eye. WO 2019/206569 A1 also discloses a method for providing a lens element which comprises providing a lens member configured to provide to the wearer in standard wearing conditions a first refractive power based on the prescription for the wearer for correcting an abnormal refraction of the eye of the wearer, providing an optical patch comprising a plurality of contiguous optical elements and forming a lens element by placing the optical patch on one of the front or back surface of the lens member. Alternatively, the method comprises casting the lens element and during the casting providing an optical patch comprising a plurality of contiguous optical elements.

EP 3 531 195 A1 discloses a spectacle lens comprising a nanostructured and/or micro structured coating. For obtaining the nanostructured and/or micro structured coating, in a first step at least one surface of the uncoated or precoated lens substrate is covered with a layer of nanoparticles and/or microparticles masking the respective uncoated or precoated surface of the lens substrate. In a second step at least one coating is applied to the layer of nanoparticles and/or microparticles. Thereby the at least one coating covers the nanoparticles and/or microparticles as well as the respective uncoated or precoated surface of the lens substrate in the intermediate spaces between the nanoparticles and/or microparticles. In a third step the nanoparticles and/or microparticles are removed and a nanostructured and/or micro structed coating remains on the respective uncoated or precoated surface of the lens substrate.

EP 2 682 807 A1 discloses a method for forming a mark on a surface of a spectacle lens by either applying an additional transparent coating at the desired position of the coating, by including a masking layer having an aperture at a desired position, both the masking layer and the aperture to be overcoated by the coating of the spectacle lens only or by tinting the lens substrate in a desired position. In case an additional transparent coating should be applied, in a first step a masking layer having an aperture is applied to the uncoated or precoated surface of the lens substrate to be marked. In a second step a transparent coating is applied to the masking layer as well as to the respective uncoated or precoated surface via the aperture of the masking layer. In a third step the masking layer and the transparent coating on top of the masking layer are removed, thereby the transparent coating remaining on top of the respective uncoated or precoated surface. Thereafter the transparent coating is overcoated with the coating of the spectacle lens, for example with a multilayer antireflective coating, parts of a multilayer reflective coating and a water repellant layer, thus resulting in the visible mark. The mark may constitute an ornamental pattern, logo, character which can be viewed due to differences in the light reflection thereby ensuring the field of vision of the wearer without discomfort.

EP 3 339 940 A1 discloses a method for applying a coating on an uncoated or precoated surface of a lens substrate via a masking layer to ensure that for example a logo is visible due to the difference of the refractive index of the coating applied with and without masking layer.

WO 2007/066006 A2 discloses a method of transferring a micro-scale pattern onto a surface of an optical article. Therefore, a layer of transferable material is deposited on a surface of a stamp having recesses and protuberances constituting micro-relief corresponding to the pattern to be transferred by contacting the stamp with a not yet dried layer of a latex being deposited on the surface of a substrate of the optical article. Depending on the pressure applied to the stamp the layer of transferable material applied to the protuberances only or the layer of transferable material applied to the recesses and the protuberances is transferred into the layer of latex. After the transfer the stamp is removed.

U.S. 2002/0158354 A1 discloses a method for making photochromic, ultraviolet/visible light absorbing, and colored plastic lenses by curing the lens forming composition using activating light. As activating light source an ultraviolet light source, an actinic light source, a visible light source and/or an infra-red light source may be used. The lens forming material may include any suitable liquid monomer and any suitable photosensitive initiator. The lens curing unit comprises a controller which inter alia determines the initial dose of light in pulsed curing applications required to cure the lens forming material, applies the activating light with an intensity and duration sufficient to equal the determined dose and calculates the dose required for the next application of activating light in pulsed curing applications. Instead of pulsed activated light curing sequences continuous activating light sequences may be used. In the latter case, equipment for generating light pulses is not required, thus reducing the cost of the lens curing apparatus.

WO 97/39880 A2 discloses the formation of an eyeglass lens by placing a liquid, polymerizable lens forming composition in a mold cavity, applying a plurality of high intensity light pulses to the lens forming composition and curing the lens forming composition to form a substantially clear eyeglass lens in a time period of less than 30 minutes. The pulses typically emanating from a flash source of light, i.e., a flash light, such as a xenon light source, have a sufficiently high intensity such that reaction is initiated in substantially all the lens forming composition that is exposed to pulses in the mold cavity. According to WO 97/39880 A2, one advantage of pulsed light application via flash lights is that even though higher intensities of light are applied, because the duration of pulses is so short the total amount of light energy applied to cure the lens forming composition is lessened. According to WO 97/39880 A2, a further significant advantage is that relatively high-mass, semi-finished lens blanks and high power cast-to-finish lenses may be produced without prematurely releasing from the mold cavity and without cracking. By interrupting or decreasing the activating light at the proper time during the cycle, the rate of heat generation and release can be controlled, and the incidence of premature release can be reduced. According to WO 97/39880 A2, the curing of a lens forming composition comprising a photoinitiator absorbing ultraviolet light having a wavelength in the range of 300 to 400 nm is possible as well as the curing of a coating composition each curable upon exposure to UV light and each comprising a photoinitiator forming a substantially clear combination coat.

WO 00/18569 A2 discloses the curing of a polymerisable lens forming composition being placed in a mold/gasket assembly and continuously exposing the composition to pulsed activating light. A flash lamp, for example a xenon light source, may be used to emit the activating light pulses. Colored lenses, photochromic lenses, ultraviolet/light absorbing colorless lenses, and clear lenses may be formed, the latter by adding a colorless, non-photochromic ultraviolet/visible light absorbing compound to the lens forming composition. By adding the ultraviolet/visible light absorbers to the lens forming composition, the curing of the clear lens composition under the more intense dosing requirements to be used for the curing of a photochromic lens composition is possible. Moreover, the formed clear lens may offer better protection against ultraviolet/visible light rays than a clear lens formed without such compounds. Further, WO 00/18569 A2 discloses an in-mold method for forming a scratch resistant coating or a tint coating over the lens. Alternatively, the lens may be tinted, or a scratch resistant coating may be applied to the lens after the lens has been demolded. The scratch resistant coating is then cured by applying activating light rays to this face of the lens. The lens forming composition as well as the coating may include a photosensitive initiator.

WO 2006/135390 A2 discloses the curing of a coating composition of a spectacle lens and of the uncoated spectacle each using pulses of activating light. The coatings such as hardcoat coatings, antireflective coatings or photochromic coatings may be cured in an in-mold or in an out-of-mold process. Exemplarily, a spectacle lens comprising a hardcoat coating and an antireflective coating manufactured by an in-mold process is described, wherein the mold with the coatings was exposed to flashes from a strobe lamp.

WO 01/94104 A2 discloses the use of ultraviolet light curable liquid compositions for forming antireflective coatings on visible light transmitting spectacle lenses. The antireflective coatings may be formed in an-mold or in an out-of-mold process. A hardcoat composition may be applied prior to the application of the antireflective coating. The ultraviolet light may be produced by a flash lamp. Light pulses may be used to affect the curing of the coating compositions.

WO 03/078145 A2 discloses an in-mold process for manufacturing a coated spectacle lens. Therefore, the casting face of the front mold member may be coated with one or more hardcoat layers before the lens forming composition is placed within the mold cavity. If two hard coat layers are used, any imperfections, such as pin holes in the first hardcoat layer are covered by the second hardcoat layer. The spectacle lens may be further coated with an antireflective coating, either in an in-mold process or in an out-of-mold process. Activating light including ultraviolet light, actinic light, visible light or infrared light may be applied to the coating composition to initiate curing of the coating composition. As activating light sources germicidal lamps, mercury vapor lamps, halide lamps and/or strobe lamps may be used. By using a strobe lamp as activation light source, less heat between process runs is produced, the activating light dosage may be controlled by controlling the intensity of light applied, the frequency of activating light flashes, the duration of activating light flashed and/or the number of activating light flashes. The lens forming material may include a photoinitiator that interacts with activating light.

WO 00/56527 A1 discloses a lens forming composition for making photochromic, ultraviolet/visible light absorbing colorless, and colored plastic lenses by curing the lens forming composition in an in-mold process with pulses of activating light. Activating light being able to affect a chemical change, e.g., to cause a polymerization to take place, may include ultraviolet light, actinic light, visible light or infrared light. A flash lamp may be used to emit activating light pulses to cure the lens forming material or to cure a lens coating. By placing a liquid coating in the mold and subsequently curing it may result in a lens having a hard coat on a surface. The flash lamp may be a xenon light source. The relatively high intensity of the xenon flash lamp and short pulse duration may allow rapid curing of the lens forming composition without imparting significant radiative heat to the composition. The xenon flash lamp is used to apply a plurality of activating light pulses to the lens forming composition to cure it to an eyeglass lens in a time period of less than 30 minutes. Due to the relatively high intensity attainable with the xenon flash lamp a deeper penetration into and/or saturation of the lens forming composition may be allowed, thereby allowing uniform curing of thicker lenses than conventional radiation-initiated curing.

WO 99/06887 A1 discloses an in-mold process to form a spectacle lens by applying a plurality of activating light pulses to the lens forming composition. The pulses may emanate from a flash light such as a xenon light source. The flash lamp may also be used to cure a lens coating. WO 99/06887 A1 further discloses an in-mold process for forming a scratch resistant coating by placing a first coating composition within a mold member, distributing the first coating composition over the casting face of the mold member, directing activating light at the mold member to cure at least a portion of the first coating composition, placing a second coating composition within the mold, the first and the second coating composition comprising each a photoinitiator, distributing the second coating composition over the first coating composition, directing activating light at the mold member to cure at least a portion of the second coating composition and to form a substantially clear combination coat, assembling the mold member with a second mold member, placing a lens forming composition comprising a photoinitiator in the cavity and directing activating light at the mold to cure at least a portion of the lens forming material to form a coated spectacle lens. Alternatively, the spectacle lens may be demolded and then tinted, or a scratch resistant coating may be applied to the lens. The lens forming composition may contain activating light absorbing compounds such as photochromic pigments, the activating light absorbing compounds inhibiting ultraviolet light from being transmitted to the eye of a user wearing the spectacle lens.

EP 20182515.5 discloses a method for drying and curing, sintering and/or hardening at least one coating precursor material by applying at least one single electromagnetic pulse. The at least one coating precursor material may comprise a hard coating precursor material resulting in a hard coating. The total process duration needed for drying and curing, sintering and/or hardening at least one coating precursor material is reduced when compared to a conventional thermal curing process applying direct heat for example in an oven. Further, the optical properties and/or the mechanical properties are tunable when varying the process parameters of the at least one single electromagnetic pulse.

Based on the theory that creating peripheral foci in front of or behind the retina of the eye to reduce or to stop the stimulus on the retina for the eye to grow, several designs for spectacle lenses were proposed as described before. The stimulus stems from a myopic or hyperopic defocus for peripheral vision, i.e., foci being positioned behind the retina or in front of the retina. When correcting the refraction of, for example, a myopic eye with a spectacle lens comprising a first refraction area and second refraction areas according to FIG. 1 of U.S. 2017/013167 A1, in foveal vision viewing through the hexagonal first refraction area having a refractive power based on a prescribed refractive power for correcting an abnormal refraction of an eye, a light bundle, coming from infinity, is refracted by the first refraction area, the cornea of the eye and the other optical components of the eye to converge to a focus situated directly on the retina, in fact on the fovea of the eye. An object point at infinity forms a perfect image for the spectacle lens wearer. Therefore, in foveal vision the eye is supposed to grow unaltered, subject to anatomical conditions not allowing the unaltered growth. In peripheral vision viewing through one of the second refraction areas shown in FIG. 1 of U.S. 2017/013167 A1 a light bundle, coming from infinity, is refracted by that second refraction area, the cornea of the eye and the other optical components of the eye to converge to a focus situated in front of the retina of the eye. Therefore, in peripheral vision where the foci are situated in front of the retina of the eye, the eye is supposed to reduce the speed of the eye growth or even to stop it completely. However, the retina of the eye is not so uniformly curved that a light bundle, coming from infinity, and being refracted by any one of the second refraction areas, the cornea of the eye and the other optical components of the eye necessarily converges to a focus situated in front of the retina of the eye. Further, the retina of the eye and the anatomy of the eye itself is individually formed or curved and thus not identical for different persons. Even the retina of the left eye and the retina of the right eye of one person are not identically formed or curved. The progression of myopia or hyperopia is not suppressible when correcting the refraction of each spectacle lens wearer with a spectacle lens comprising as for example in FIG. 1 of U.S. 2017/013167 A1 the identical defined first refraction area and the identical defined second refraction areas. U.S. 2017/013167 A1 is silent with respect to the manufacturing method of a spectacle lens comprising a first refraction area and second refraction areas. WO 2019/166653 A1, 6WO 2019/166654 A1, WO 2019/166655 A1, WO 2019/166657 A1 and WO 2019/166659 A1 for example suggest for manufacturing of the spectacle lenses described therein different technologies such as direct surfacing, molding, casting or injection, embossing, filming, or photolithography. Using for example a molding process for manufacturing one the spectacle lenses described in U.S. 2017/013167 A1, WO 2019/166653 A1, WO 2019/166654 A1, WO 2019/166655 A1, WO 2019/166657 A1 or WO 2019/166659 A1 requires each a master mold of extremely high robustness and of very high quality to be able to obtain the respective optical surfaces. A mold made of glass would fulfill the before mentioned requirements but is challenging and expensive to process. Using a molding process would require a different master mold for each optical surface to be realized therewith, which is for example for efficiency and cost reasons not suitable in a high throughput manufacturing process.

Additionally to the before mentioned methods, in particular additionally to the (injection) molding and the photolithography, WO 2020/078964 A1 suggests as a method for manufacturing an optical article, the optical article comprising a base lens substrate, an abrasion resistant coating, and at least one optical element protruding from the front surface or from the back surface of the abrasion resistant coating, the additive manufacturing of the at least one optical element protruding from the front surface of the abrasion resistant coating.

A very reliable method for manufacturing any desired optical surface without the need of a mold is disclosed in EP 3 812 142 A1. The method disclosed in EP 3 812 142 A1 allows even the manufacturing of final optical surfaces which are not accessible by conventional grinding and polishing processes. The method disclosed herein is independent of the optical material to be used for the lens substrate. The method requires at least one coating completely or at least partially covering the uncoated or pre-coated lens substrate, the at least one coating being modifiable when contacting or contacted with at least one medium. The modification of the at least one coating is typically irreversible and of long-term stability. In contrast to EP 3 531 195 A1 or to WO 2020/078964 A1 for example no additional coating or additional material is required to modify or to adapt and/or to create any desired final optical surface However, as described in EP 3 812 142 A1 the period of time for contacting the at least one coating modifiable when contacted with at least one medium able to modify the at least one coating lies within a range of typically 25 minutes to 30 hours, further typically 30 minutes to 20 hours, more typically 35 minutes to 15 hours and most typically 40 minutes to 10 hours. The at least one coating may be contacted with the at least one medium at room temperature, i.e., at a temperature of 22° C.±2° C., or at elevated temperatures comprising a temperature range of typically 25° C. to 80° C., further typically 27° C. to 55° C., more typically 30° C. to 50° C. and most typically 35° C. to 45° C. The at least one coating may be contacted with the at least one medium while irradiation with xenon light typically of a wavelength range of 280 nm to 1200 nm. The before mentioned process conditions disclosed in EP 3 812 142 A1 may be combined in any desired way.

SUMMARY

It is an object of the present disclosure to accelerate the manufacturing method of a spectacle lens as disclosed therein. The time for obtaining any desired optical surface should be significantly reduced while the manufacturing method, i.e., the contacting of at least one coating with at least one medium able to modify the at least one coating itself, should be maintained. Further, the optical material of the lens substrate should not be restricted.

The object is achieved by a method of manufacturing a spectacle lens including completely or partially contacting a surface of at least one coating with at least one medium and applying at least one electromagnetic pulse to at least one surface of the spectacle lens.

In contrast to the before mentioned methods for manufacturing a spectacle lens with a specific optical surface and as already described in EP 3 812 142 A1, the method for manufacturing a spectacle lens comprising any one of the before mentioned optical surfaces or comprising any other targeted final optical surface is based on a spectacle lens comprising a lens substrate and at least one coating that is modifiable when contacted with at least one medium being able to modify the at least one coating. However, in contrast to EP 3 812 142 A1 it has been discovered that for obtaining any targeted final optical surface the contact time of the surface of the at least one coating with the at least one medium is significantly reduced not by combining all the variants disclosed in EP 3 812 142 A1, i.e., by elevating the temperature and by irradiating with xenon light and by sprinkling with demineralized water, but by applying at least one single electromagnetic pulse to a spectacle lens comprising the at least one coating, the at least one coating being in contact or having been in contact with the at least one medium. Furthermore, the total process duration for obtaining a spectacle lens having any targeted final optical surface is significantly reduced not by combining all the variants disclosed in EP 3 812 142 A1, but by applying at least one single electromagnetic pulse to at least one of the surfaces of a spectacle lens, the spectacle lens or the spectacle lens substrate comprising (i) on the front surface at least one coating being modifiable when contacted with at least one medium,
(ii) on the back surface at least one coating being modifiable when contacted with at least one medium, or
(iii) on the front surface at least one coating being modifiable when contacted with at least one medium and on the back surface at least one coating being modifiable when contacted with at least one medium, each of the at least one coatings being in contact or having been in contact with at least one medium being able to modify each of the at least one coatings. In case the spectacle lens comprises only on one surface of the spectacle lens, i.e., either on the front surface or on the back surface thereof, the at least one coating being modifiable when contacted with the at least one medium being able to modify the at least one coating, it is typically irrespective for obtaining the targeted final optical surface of the spectacle lens if the at least one single electromagnetic pulse is applied to the front surface or to the back surface, as explained in detail below.

BRIEF DESCRIPTION OF THE DRAWING

The disclosure will now be described with reference to the drawing wherein:
The FIGURE shows lenslet shapes and surface profiles of the lenslets of example 8, 9, and 10.

DESCRIPTION OF EXEMPLARY EMBODIMENTS

To apply at least one single electromagnetic pulse using a so-called flashlight annealing or photonic curing method has not been that obvious since this method involves exposure of the lens substrate, the at least one modifiable coating and the at least one medium to ultra-short light pulses of high intensity. The major asset of this photonic curing method is its capability to obtain temperatures higher than 1000° C. for example for a very short time without affecting the lens substrate which may be based on a temperature sensitive optical material and which would not withstand such high temperatures. The very short timescale of each single electromagnetic pulse allows the selective processing of the at least one coating while not deteriorating a lens substrate based on a temperature sensitive optical material. The at least one single electromagnetic pulse can be applied from at least one electromagnetic source selected from the group consisting of at least one flash lamp, typically from at least one xenon flash lamp, at least one halogen lamp, at least one directed plasma arc, at least one laser, at least one microwave generator, at least one induction heater, at least one electron beam, at least one stroboscope and at least one mercury lamp. The at least one single electromagnetic pulse is typically applied from at least one flash lamp. Typically the at least one flash lamp is a flash lamp filled with a gas selected from xenon, krypton and/or argon, typically xenon. The at least one single electromagnetic pulse has typically a wavelength in the range from 100 nm to 1800 nm, more typically in the range from 150 nm to 1300 nm, most typically in the range from 200 nm to 1000 nm. The at least one single electromagnetic pulse also typically has a wavelength in the range from 350 nm to 1000 nm, more typically in the range from 400 nm to 800 nm, most typically in the range from 420 nm to 700 nm. The wavelength of the at least one single electromagnetic pulse applied from at least one of the before mentioned electromagnetic sources is typically in these wavelength ranges. The at least one single electromagnetic pulse is applied to at least one of the surfaces of the spectacle lens, i.e., (i) to the front surface of the spectacle lens, (i) to the back surface of the spectacle lens or (iii) to the front surface and the back surface of the spectacle lens. In case (iii) when at least one single electromagnetic pulse is to be applied to the front surface and the back surface of the spectacle lens the position of one of the electromagnetic sources mentioned before may be alternated so that the at least one single electromagnetic pulse is either directly applied to the front surface or directly applied to the back surface of the spectacle lens. Alternatively, in the before mentioned case (iii) at least two of the electromagnetic sources mentioned before are positioned in that the at least one single electromagnetic pulse is directly applied to the front surface of the spectacle lens and at least one single electromagnetic pulse is directly applied to the back surface of the spectacle lens, either simultaneously or alternately. In any case at least two electromagnetic sources are used these at least two electromagnetic sources may be of the identical type or of a different type.

In case only one of the surfaces of the spectacle lens comprises at least one coating being modifiable when contacted with at least one medium, the at least one single electromagnetic pulse may be applied to the surface of the spectacle lens comprising the at least one coating or the at least one single electromagnetic pulse may be applied to the surface of the spectacle lens not comprising the at least one coating. Again, reference is made to the explanation below. In case both the front surface and the back surface of the spectacle lens each are comprising at least one coating each being modifiable when contacted with at least one medium, the at least one single electromagnetic pulse may be applied to (i) the front surface of the spectacle lens, (ii) the back surface of the spectacle lens or (iii) the front surface and the back surface of the spectacle lens. In the case (iii) the before mentioned possibilities with respect to the electromagnetic source are applicable.

Taking into consideration that EP 3 812 142 A1 already suggests an irradiation with xenon light typically having a wavelength range of 280 nm to 1200 nm, it has been even more surprising that applying at least one single electromagnetic pulse for example and typically emanating from at least one flash lamp filled with xenon gas, i.e., by using a photonic curing method, is reducing significantly the total process duration for obtaining the final optical surface of the at least one coating modifiable when contacted with at least one medium being able to modify the at least one coating. Further, to reduce the total process duration compared to the method described in EP 3 812 142 A1 apart from the application of at least one single electromagnetic pulse no additional effort is necessary. In other words, the contacting of at least one coating being modifiable when contacted with at least one medium being able to modify the at least one coating results after the application of at least one single electromagnetic pulse, i.e., by using the photonic curing technique, in any desired or targeted final optical surface of the at least one coating in compared to the method described in EP 3 812 142 A1 a significantly reduced total process duration.

"Single electromagnetic pulse" means the light that is delivered by at least one of the above-mentioned electromagnetic sources and applied to at least one surface of the spectacle lens comprising the at least one modifiable coating, the at least one modifiable coating thereby being (i) completely or at least partially in contact with the at least one medium or (ii) completely or at least partially covered by the at least one medium. The at least one single electromagnetic pulse may be applied in one of the wavelength ranges defined above. The at least one single electromagnetic pulse typically has a defined duration, i.e., a defined envelope. The envelope of the at least one single electromagnetic pulse is defined as the period in which the at least one single electromagnetic pulse is applied to the at least one surface of the spectacle lens comprising the at least one coating, the at least one coating being completely or at least partially covered by the at least one medium. The envelope of the at least one single electromagnetic pulse is further defined as the period in which the at least one single electromagnetic pulse is applied to the at least one surface of the spectacle lens not comprising at least one coating being modifiable when contacted with at least one medium or covered by at least one medium, the at least one medium being able to modify the at least one coating. The envelope may be in a range from 50 µs to 200 ms, typically in a range from 100 µs to 150 ms. Each single electromagnetic pulse may comprise at least two micro-pulses, each of the at least two micro-pulses having a defined duration within the envelope of each single electromagnetic pulse. The duration of the at least two micro-pulses within the envelope of a single electromagnetic pulse may be identical to or different from each other. The percentage of the duration of all the micro-pulses within the envelope of a single electromagnetic pulse is defined as the duty cycle of the single electromagnetic pulse. Further, the at least one single electromagnetic pulse or at least one micro-pulse has a defined peak intensity. The peak intensity is defined as the rate at which light energy is applied per unit time to a unit area of the at least one coating, the at least one coating being covered completely or at least partially by the at least one medium, by one single electromagnetic pulse or one micro-pulse within a single electromagnetic pulse. The peak intensity is typically in the range from 0.01 W/cm² to 200 W/cm², further typically in the range from 0.1 W/cm² to 150 W/cm², more typically from 0.5 W/cm² to 100 W/cm² and most typically from 1 W/cm² to 60 W/cm². The peak intensity of at least two micro-pulses within the envelope of a single electromagnetic pulse may be identical to or different from each other. Typically the peak intensity of the at least two micro-pulses within the envelope of a single electromagnetic pulse is identical to each other. The peak intensity between two consecutive micro-pulses within the envelope of a single electromagnetic pulse does not need to be zero or does not need to be constant or does not need to be equal. If necessary, each single electromagnetic pulse may be repeated to provide an electromagnetic pulse train. Within the electromagnetic pulse train, each single electromagnetic pulse may be repeated at least twice and up to 1000 times, typically each single electromagnetic pulse is repeated between 2 and 100 times. Within an electromagnetic pulse train, typically an identical single electromagnetic pulse is repeated. Within an electromagnetic pulse train, the envelope of each single electromagnetic pulse may be identical to or different from each other. Typically, within an electromagnetic pulse train, the envelope of each single electromagnetic pulse is identical. Within an electromagnetic pulse train, each single electromagnetic pulse may comprise at least two micro-pulses, the at least two micro-pulses may be identical to or different from each other with respect to their peak intensity, duration and/or duty cycle. Typically, within an electromagnetic pulse train, each single electromagnetic pulse may comprise at least two micro-pulses, the at least two micro-pulses being identical to each other with respect to their peak intensity, duration and/or duty cycle. Within the electromagnetic pulse train comprising at least two single electromagnetic pulses, the at least two single electromagnetic pulses may be repeated with a repetition rate in a range from 0.1 Hz to 5 Hz, typically from 0.2 Hz to 4 Hz, further typically from 0.3 Hz to 3.5 Hz and most typically from 0.4 to 2 Hz. The peak intensity of at least one single electromagnetic pulse within the envelope of the at least one single electromagnetic pulse may progressively decrease within the envelope and/or with each micro-pulse within the at least one single electromagnetic pulse. For example, this decrease can be due to limitations of the charged capacitors of the electromagnetic source used for generating the at least one single electromagnetic pulse. The dose applied by at least one single electromagnetic pulse to the spectacle lens comprising the at least one coating, the at least one coating being covered completely or at least partially with the at least one medium, is the average intensity delivered with each single electromagnetic pulse over the total duration of the envelope where each single electromagnetic pulse may or may not comprise at least two micro-pulses each delivering a discrete amount of intensity. The dose applied by at least one single electromagnetic pulse may typically be within the range from 0.001 J/cm² to 50 J/cm², further typically from 0.1 J/cm² to 30 J/cm², more typically from 1 J/cm² to 20 J/cm² and most typically from 2.0 J/cm² to 15 J/cm². Particularly typically, the dose applied is within a range from 3 J/cm² to 8 J/cm².

Any variation of any one of the before mentioned process parameters of the at least one single electromagnetic pulse may influence the optical surface obtained when the at least one single electromagnetic pulse is applied to the at least one coating being modifiable with at least one medium. Further, any variation of any one of the before mentioned process parameters of the at least one single electromagnetic pulse may influence the optical surface obtained when the at least one single electromagnetic pulse is applied to the surface of the spectacle lens not comprising the at least one coating being modifiable when contacted with at least one medium. Not only the dimensions in terms of for example at least width and height of a surface modification being for example at least one micro lens are adjustable by applying the appropriate at least one single electromagnetic pulse, but also the shape of a surface modification is adjustable dependent on the at least one single electromagnetic pulse applied. Thus, the application of the at least one single electromagnetic pulse to the at least one coating being partially or completely covered with at least one medium being able to modify the at least one coating does not only significantly reduce the total process duration compared to the contact time disclosed in EP 3 812 142 A1, but simultaneously offers extended possibilities for obtainable surface modifications of the at least one coating. Further, the application of the at least one single electromagnetic pulse to the surface of the spectacle lens or spectacle lens substrate not comprising at least one coating being modifiable when contacted with at least one medium being able to modify the at least one coating, i.e., the application of the at least one single electromagnetic pulse to the surface of the spectacle lens opposite the surface of the spectacle lens comprising at least one coating being modifiable when contacted with at least one medium being able to modify the at least one coating, does not only significantly reduce the total process duration compared to the contact time disclosed in EP 3 812 142 A1, but simultaneously offers extended possibilities for obtainable surface modifications of the at least one coating.

The application of at least one single electromagnetic pulse comprises the application of exact one single electromagnetic pulse, the exact one single electromagnetic pulse may be subdivided as described above in at least two micro-pulses. The application of at least one single electromagnetic pulse also comprises the application of single electromagnetic pulses, typically at least two single electromagnetic pulses, further typically a plurality of single electromagnetic pulses, each of which again may be subdivided in at least two micro-pulses as explained before. Independent of the exact number of single electromagnetic pulses the before given explanations with respect to the at least one single electromagnetic pulse shall apply.

The spectacle lens may comprise at least one coating being modifiable when contacted with at least one medium being able to modify the at least one coating on the front surface, according to ISO 13666:2019(E), section 3.2.13, the surface of the lens intended to be fitted away from the eye, and/or on the back surface, according to ISO 13666:2019 (E), section 3.2.14, the surface of the lens intended to be fitted nearer to the eye. The term front surface and the term back surface according to the definitions given before shall apply to the lens substrate as well. Typically, the spectacle lens comprises the at least one coating being modifiable when contacted with at least one medium, the at least one medium being able to modify the at least one coating, on the front surface thereof. The at least one single electromagnetic pulse may be applied to the front surface and/or to the back surface of the spectacle lens comprising the at least one modifiable coating. Typically, the at least one single electromagnetic pulse is applied to the front surface of the spectacle lens, the front surface typically comprising the at least one coating and the at least one medium. Further typically, the at least one coating of the front surface of the spectacle lens or the spectacle lens substrate respectively is covered completely or partially with at least one medium being able to modify the surface topography of the at least one coating or is completely or partially in contact with at least one medium being able to modify the surface topography of the at least one coating.

However, in case the spectacle lens comprises at least one modifiable coating and at least one medium being able to modify the at least one coating on the front surface and on the back surface thereof, the at least one single electromagnetic pulse may still be applied to one surface only, for example to the front surface only. In this case the surface of the at least one coating, the at least one coating being completely or at least partially covered by the at least one medium, on the opposite surface, here the back surface of the spectacle lens may be modified simultaneously and typically within the same time by the at least one single electromagnetic pulse applied to the one surface only, here the front surface. This simultaneous modification is assumed to be based on the transfer of energy from the at least one single electromagnetic pulse to both the front surface and back surface of the lens substrate due to minor differences in the transparency of the lens substrate and the at least one modifiable coating. The transparency typically is the transmittance at a given wavelength, the transmittance typically determined by using a UV VIS spectrometer, e.g., the UV VIS spectrometer Perkin Elmer 950S of Perkin Elmer. The part of light of the at least one single electromagnetic pulse that is not or only minimally absorbed by the at least one modifiable coating and/or the at least one medium and/or the lens substrate is reflected at all possible interfaces, for example at the interface between the lens substrate and the adjacent coating and/or at the interface between the stage on which the spectacle lens is placed and the adjacent coating and/or at the interface between the stage on which the spectacle lens is placed and the adjacent at least one medium. The part of light of the at least one single electromagnetic pulse that is absorbed for example by the lens substrate is assumed to be responsible for a short instantaneous heating of the lens substrate while still not deteriorating the lens substrate. In addition, as due to the short instantaneous heating of the lens substrate the temperature is higher than the temperature of the at least one modifiable coating, it is assumed that the modification of the at least one coating on the opposite surface is based on an indirect effect caused by the at least one single electromagnetic pulse applied. Further, the back reflection of the at least one single electromagnetic pulse from the stage on which the spectacle lens is placed is also assumed to contribute to the modification of the at least one coating on the opposite surface to which the at least one single electromagnetic pulse is not directly applied to. The combination of at least the direct energy transfer from the at least one single electromagnetic pulse, the indirect energy transfer from the heated lens substrate and the indirect energy transfer from the stage is assumed to be a reasoned explanation for a simultaneous modification of the at least one coating by the at least one medium on the front surface and of the back surface of a spectacle lens by applying at least one single electromagnetic pulse to one of the surfaces only. Typically, the total process duration is not or at least not significantly prolonged by applying the at least one single electromagnetic pulse to one surface only but simultaneously modifying at least one coating on both surfaces.

The explanation given before is assumed to be valid for the case when only one of the surfaces of the spectacle lens, e.g., the front surface, comprises at least one coating being modifiable by at least one medium and the at least one single electromagnetic pulse is applied to the opposite surface of the spectacle lens. e.g., the back surface, only. The surface modification of the at least one coating being modifiable when completely or partially covered with at least one medium or being modifiable when contacted or having been contacted completely or partially with at least one medium, the at least one medium being able to modify the at least one coating, in particular to surface modify the at least one coating, is assumed to be due to the energy transfer from the at least one single electromagnetic pulse to the surface of the lens substrate. This energy transfer in turn is assumed to be due to minor differences in the transparency of the lens substrate and the at least one coating being modifiable when contacted with at least one medium. The transparency typically is the transmittance at a given wavelength, the transmittance typically determined by using a UV VIS spectrometer, e.g., the UV VIS spectrometer Perkin Elmer 950S of Perkin Elmer. The part of light of the at least one single electromagnetic pulse that is not or only minimally absorbed by the lens substrate is reflected at all possible interfaces, for example at the interface between the lens substrate and any adjacent coating and/or at the interface between the stage on which the spectacle lens is placed and any adjacent coating. The part of light of the at least one single electromagnetic pulse that is absorbed for example by the lens substrate is assumed to be responsible for a short instantaneous heating of the lens substrate while still not deteriorating the lens substrate. In addition, as due to the short instantaneous heating of the lens substrate the temperature is higher than the temperature of the at least one modifiable coating, it is assumed that the modification of the at least one coating, in particular the surface of the at least one coating, on the opposite surface of the spectacle lens, to which no single electromagnetic pulse is directly applied to, is based on an indirect effect caused by the at least one single electromagnetic pulse applied. Further, the back reflection of the at least one single electromagnetic pulse from the stage on which the spectacle lens is placed is also assumed to contribute to the modification of the at least one coating on the opposite surface to which the at least one single electromagnetic pulse is not directly applied to. The indirect energy transfer from the heated lens substrate and the indirect energy transfer from the stage is assumed to be a reasoned explanation for the modification of the at least one coating, in particular the surface of the at least one coating, by applying at least one single electromagnetic pulse to that surface of the spectacle lens not comprising the at least one coating being modifiable when contacted with at least one medium. Typically, the total process duration is not or at least not significantly prolonged by applying the at least one single electromagnetic pulse to one surface only but modifying at least one coating on the opposite surface.

During the application of at least one single electromagnetic pulse to at least one surface of a spectacle lens comprising the at least one coating that is modifiable when contacted with at least one medium able to modify the at least one coating typically special care is to be taken that the dose of the at least one single electromagnetic pulse is not too high to completely evaporate the at least one medium covering completely or at least partially the at least one coating or to randomly displace the at least one medium or not to randomly displace the at least one medium, the random displacement assumed to be due to for example the Leidenfrost effect. A complete evaporation of the at least one medium would result in that the targeted optical surface is not or not completely obtainable. An uncontrolled random displacement of the at least one medium would result in that the targeted optical surface is not obtainable. Alternatively, a controlled displacement of the at least one medium using for example the Leidenfrost effect may be used to modify the at least one coating in positions which before the application of at least one single electromagnetic pulse were not in contact with or not covered by the at least one medium. For some applications such as myopia control one of the approaches is to induce blur. In this context, a controlled or even an uncontrolled displacement of the at least one medium during the application of the at least one single electromagnetic pulse might be used to tune or modify the displacement parameters such as the amount of at least one medium displaced or the distance of the at least one medium displaced.

The application of at least one single electromagnetic pulse to at least one surface of a spectacle lens comprising at least one coating being modifiable when contacted with at least one medium able to modify the at least one coating results in target optical surface which are identical to the target optical surfaces achievable by the method disclosed in EP 3 812 142 A1, but the total process duration is much shorter than the contact time or a total process duration needed in EP 3 812 142 A1. The total process duration, i.e., the total time needed for modifying the at least one coating applied on at least one surface of an uncoated or precoated lens substrate by using at least one single electromagnetic pulse as described above, lies within a range typically from 100 µs to 7 min, further typically from 300 µs to 5 min, more typically from 500 µs to 4 min and most typically from 1 ms to 3 min. For example, to modify the at least one coating by contacting with at least one medium to obtain at least one micro lens having a 3D Gaussian profile with a height of 800 nm, and a width of 500 nm, the total process duration when at least one single electromagnetic pulse is applied is less than 70 seconds whereas for the creation of the identical at least one micro lens by using the conditions described in EP 3 812 142 A1 a contact time or a total process duration of about 20 hours is required.

The modification of at least one coating with at least one medium by using at least one single electromagnetic pulse may be done in a batch process or in a continuous process. A batch process may be done for example with no displacement during the application of at least one single electromagnetic pulse. A continuous process may be done for example with displacement during the application of at least one single electromagnetic pulse. An example of the continuous process is a process using a conveyor belt. Both in a batch process and in a continuous process a single spectacle lens comprising at least one modifiable coating covered completely or at least partially with at least one medium able to modify the at least one coating or at least two such spectacle lenses, may be on the stage when at least one single electromagnetic pulse is applied. One major advantage of applying at least one single electromagnetic pulse to a spectacle lens comprising at least one modifiable coating and in direct contact with the at least one modifiable coating at least one medium being able to modify the at least one medium is the possibility to have a localized exposure of the spectacle lens by the application of at least one single electromagnetic pulse. Thus, the dose of the at least one single electromagnetic pulse may be adapted or varied for different regions of the spectacle lens. The application of the at least one single electromagnetic pulse may result in at least one modification of the at least one coating, the at least one modification being at least one micro lens of any arbitrary form or shape. The adaption or variation of the dose of the at least one single electromagnetic pulse may result for example in or may be used to obtain a gradient of dioptres of the micro lenses. Further, the application of the at least one single electromagnetic pulse may result in at least one modification of the at least one coating, the at least one modification resulting in the final optical surface or resulting in the final optical surfaces of the spectacle lens.

Typically, a continuous process is used to adapt or to vary for different regions of the spectacle lens the dose of the at least one single electromagnetic pulse applied. Irrespective of an application of at least one single electromagnetic pulse in a batch process or in a continuous process to at least the front surface of a spectacle lens, to at least the back surface of a spectacle lens or to the front surface and the back surface of the spectacle lens, either directly or indirectly, as described above, the application of at least one single electromagnetic pulse allows a selective surface modification of the at least one coating being modifiable when contacted with at least one medium being able to modify the at least one coating. Selective surface modification typically comprises that at least the at least one position of the at least one surface of the spectacle lens to which the at least one single electromagnetic pulse is applied to could be specifically selected. The at least one specifically selected position of at least one surface of the spectacle lens could be the surface to which the at least one single electromagnetic pulse is directly applied to or could be the surface to which the at least one single electromagnetic pulse is not directly applied to. Further typically, selective surface modification comprises that the at least one single electromagnetic pulse is applied to at least one of the surfaces of the spectacle lens, as described above, with a specified dose. Further typically, selective surface modification comprises that the at least one position to which the at least one single electromagnetic pulse is applied to is specifically selected and that the dose with which the at least one single electromagnetic pulse is applied to at least one of the surfaces of the spectacle lens is specifically selected as well. A selective surface modification comprising the specifically selected position to which at least one single electromagnetic pulse is to be applied to and/or the specifically selected dose of at least one single electromagnetic pulse could be achieved without the need of any additional measures. Additional measures in this respect could be for example the shielding of that part of a surface of a spectacle lens that is not to be modified. The method described in EP 3 812 142 A1 according to which an irradiation with xenon light is possible does not allow to irradiate a specific position on a spectacle lens' surface without additional measures in contrast to the method described herein according to which at least one single electromagnetic pulse is applied.

In case the at least one modifiable coating is completely covered with the at least one medium, but only at least one specific position and/or at least one specific region of the at least one coating should be modified and in case the modification does not start immediately when the at least one medium is applied an appropriate continuous process, optionally combined with a shielding of the not to be modified coating, may be used.

The at least one coating to be modified is at least one coating that typically itself is irreversibly modifiable, typically irreversibly modifiable when contacting or contacted with at least one medium that can cause the irreversible modification. The irreversible modification is an irreversible modification of the at least one coating itself, i.e., in contrast to for example the method described in EP 3 531 195 A1 no additional or subsequent coating needs to be applied for the irreversible modification of the at least one coating. Further, the at least one medium used for contacting with the at least one coating is not to be confused with the layer of nanoparticles and/or microparticles used for example in the method described in EP 3 531 195 A1 for masking a surface to be coated. The irreversible modification of the at least one coating is typically evoked by contacting the at least one coating at each specific position and/or each specific region that is to be modified with at least one medium able to cause the irreversible modification. The irreversible modification of the at least one coating typically is an irreversible swelling of the at least one coating, caused by contacting the surface of the at least one coating with at least one medium able to cause irreversible swelling. The irreversible swelling of the at least one coating may be observed as protrusion or as depression. In case the irreversible swelling is observed as protrusion typically most of the surface has not been modified or swollen. In case the irreversible swelling is observed as depression typically most of the surface has been modified or swollen.

To modify the at least one coating at a specific position and/or in a specific region the at least one coating may be applied to an uncoated or precoated surface of the lens substrate to either fully cover the adjacent surface underneath or to partially cover the adjacent surface underneath. The uncoated or precoated surface may be partially covered with the at least one coating in that only the parts of the uncoated or precoated surface are covered with the at least one coating that is to be modified and no further parts of the uncoated or precoated surface are covered therewith.

The at least one medium is applied to the at least one coating typically via a printing method, further typically via ink jet printing. The application of the at least one medium via ink jet printing has the advantage that only the at least one specific position and/or the at least one specific region of the at least one coating that should be modified is in contact with the at least one medium. Alternatively or additionally to the selective application via a printing method, the not to be modified regions may be masked.

The modification of the at least one coating may be local or extensive. The modification may be of any arbitrary form or shape. The modification may define densely packed structures or not densely packed structures. The aspect ratio, i.e., the ratio from height or depth to the smallest lateral extension, of each modification may be tunable or adjustable. The modification may comprise at least one structure that may behave as micro lens or may comprise at least two structures acting optically collectively. The shape of an individual modification may be 3D Gaussian shaped, cone shaped, volcano shaped with at least one crater, cone shaped with flat top or may be complex shaped. The modification may result in individually adaptable dioptric powers at specific positions.

The modification is observed as a swelling which in turn is assumed to be a diffusion-controlled swelling. The diffusion-controlled swelling is assumed to be dependent on or restricted at least by the time the at least one medium is in contact with the at least one coating and the contact surface between the at least one medium and the at least one coating. For the diffusion-controlled swelling, typically the Fick's law, typically first and second Fick's law of diffusion, is to be considered.

The at least one coating being modifiable when in contact or contacted with at least one medium is typically a photochromic coating or a coating based on a coating composition usable for a photochromic coating but without any photochromic dye. The contacting of at least one coating being modifiable when in contact or having been in contact with at least one medium with the at least one medium results in a modification of the at least one coating itself. The modification of the at least one coating itself typically is a modification of the surface of the at least one coating. The modification of the at least one coating is, as mentioned before, typically is a swelling of the at least one coating, further typically a diffusion-controlled swelling of the at least one coating. So, phrased differently, no additional coating(s) are needed to modify the surface topography of the at least one coating.

The spectacle lens, typically corrective lens, may comprise the at least one modifiable coating on the front surface and on the back surface. In case the at least one modifiable coating is a photochromic coating or is a coating based on a coating composition usable for a photochromic coating but the coating composition is not comprising a photochromic dye, only the front surface of the spectacle lens, typically corrective lens, comprises the respective at least one coating. The modification of the final optical surface is typically a modification or adaption of the final optical surface considering peripheral vision and not impairing foveal vision. A modification or an adaption of the final optical surface considering peripheral vision and not impairing foveal vision is typically a subsequent change of a final optical surface. Hereby the final optical surface is final with respect to foveal vision. The modification or adaption of the final optical surface considering the peripheral vision typically is a subsequent modification of the final optical surface resulting in at least one micro lens. The at least one micro lens may have any arbitrary shape or form individually adapted considering the peripheral refraction of a wearer's eye(s). In case the subsequent modification of the final optical surface results in at least two micro lenses of any arbitrary shape or form, the at least two micro lenses are distributed across the surface considering the individual peripheral refraction. The arbitrary shape or form of the at least two micro lenses may be identical or different to each other, each considering the individual peripheral refraction. The at least one micro lens or the at least two micro lenses are typically not impairing foveal vision.

The at least one photochromic coating may for example be based on a photochromic composition described in EP 1 433 814 A1, EP 1 602 479 A1 or EP 1 561 571 A1. The at least one coating based on a coating composition usually resulting in a photochromic composition may comprise a composition described in EP 1 433 814 A1, EP 1 602 479 A1 or EP 1 561 571 A1, but without any photochromic dye.

EP 1 433 814 A1, in particular EP 1 433 814 A1, claim 1, discloses a photochromic composition comprising (1) 100 parts by weight of radically polymerizable monomers; (2) 0.01 to 20 parts by weight of an amine compound; and (3) 0.01 to 20 parts by weight of a photochromic compound, the radically polymerizable monomers including a radically polymerizable monomer having a silanol group or a group which forms a silanol group by hydrolysis, and/or a radically polymerizable monomer having an isocyanate group. According to EP 1 433 814 A1 to increase adhesion between the photochromic coating resulting from the photochromic composition described therein and a spectacle lens substrate, a radically polymerizable monomer having a silanol group or a group which forms a silanol group by hydrolysis or a radically polymerizable monomer having an isocyanate group is used. Usable monomers are mentioned in EP 1 433 814 A1, page 3, paragraph [0025], to page 7, paragraph [0046]. Additionally, according to EP 1 433 814 A1 the photochromic composition may include other radically polymerizable monomers. As other polymerizable monomers, a combination of a radically polymerizable monomer having a homopolymer L-scale Rockwell hardness of at least 60 ("high-hardness monomer") and a radically polymerizable monomer having a homopolymer L-scale Rockwell hardness of 40 or less ("low-hardness monomer") is typically used to improve the characteristic properties such as solvent resistance, hardness and heat resistance of the resulting photochromic coating or the photochromic properties thereof such as colour development intensity and fading speed. Examples and explanations with respect to the high-hardness monomers and the low-hardness monomers are given in EP 1 433 814 A1, page 7, paragraph [0052], to page 13, paragraph [0096]. To improve the balance of the characteristic properties such as solvent resistance, hardness and heat resistance or photochromic properties such as colour development intensity and fading speed of the resulting photochromic coating, the amount of a low-hardness monomer is typically 5 to 70% by weight and the amount of a high-hardness monomer is typically 5 to 95% by weight based on the total of all the other radically polymerizable monomers excluding the radically polymerizable monomer having a silanol group or a group which forms a silanol group by hydrolysis and the radically polymerizable monomer having an isocyanate group. Further, according to EP 1 433 814 A1, it is particularly typical that a monomer having at least three radically polymerizable groups should be contained as the high-hardness monomer in an amount of at least 5% by weight based on the total of all other radically polymerizable monomers. Further typically, according to EP 1 433 814 A1, the radically polymerizable monomers include a radically polymerizable monomer having at least one epoxy group and at least one radically polymerizable group in the molecule besides the mentioned monomers classified by hardness. The durability of a photochromic compound and the adhesion of the photochromic coating can be improved by using the radically polymerizable monomer having at least one epoxy group. Radically polymerizable monomers having at least one epoxy group and at least one radically polymerizable group in the molecule are disclosed in EP 1 433 814 A1, page 13, paragraph [0101], to page 14, paragraph [0105]. According to EP 1 433 814 A1, the amount of the radically polymerizable monomer having at least one epoxy group and at least one radically polymerizable group in the molecule is typically 0.01 to 30% by weight, particularly typically 0.1 to 20% by weight based on the total of all other radically polymerizable monomers. The photochromic composition described in EP 1 433 814 A1 comprises at least one amine compound in an amount of 0.01 to 20 parts by weight based on 100 parts by weight of the total of all the radically polymerizable monomers in addition to the above mentioned radically polymerizable monomers. Examples for the at least one amine compound is given in EP 1 433 814 A1, page 14, paragraph [0108], to page 15, paragraph [0112]. The photochromic composition disclosed in EP 1 433 814 A1 comprises at least one photochromic compound in an amount of 0.01 to 20 parts by weight, typically 0.05 to 15 parts by weight and more typically 0.1 to 10 parts by weight based on 100 parts by weight of the total of all radically polymerizable monomers. Examples for photochromic compounds are given in EP 1 433 814 A1, page 15, paragraph [0114] to page 20, paragraph [0122].

EP 1 602 479 A1, in particular EP 1 602 479 A1, claim 9, discloses a photochromic composition comprising 100 parts by weight of a radically polymerizable monomer, 0.001 to 5 parts by weight of a silicone base or fluorine base surfactant and 0.01 to 20 parts by weight of a photochromic compound. According to EP 1 602 479 A1, the photochromic composition comprises a radically polymerizable monomer having a silanol group or a group which forms a silanol group by hydrolysis, an amine compound and a photochromic compound. The use amount of the radically polymerizable monomer having a silanol group or a group which forms a silanol group by hydrolysis is suitably 0.5 to 20% by weight, particularly 1 to 10% by weight based on the total weight of the whole coating agents. Other radically polymerizable monomers which according to EP 1 602 479 A1 can be used together with the radically polymerizable monomer having a silanol group or a group which forms a silanol group by hydrolysis, such as for example trimethylolpropane trimethacrylate, trimethylolpropane triacrylate, tetramethylolmethane trimethacrylate, tetramethylolmethane triacrylate, trimethylolpropane triethylene glycol triacrylate, pentaerythritol tetramethacrylate, dipentaerythritol hexaacrylate, urethane oligomer tetraacrylate, urethane oligomer hexamethacrylate, urethane oligomer hexaacrylate, polyester oligomer hexaacrylate, diethyleneglycol dimethacrylate, triethyleneglycol dimethacrylate, tetraethyleneglycol dimethacrylate, tripropyleneglycol dimethacrylate, bisphenol A dimethacrylate, 2,2-bis(4-methacryloyloxyethoxy-diphenyl) propane, glycidyl methacrylate, 2,2-bis(4-acryloyloxypolyethylene glycol phenyl)propane having an average molecular weight of 776 or methyl ether polyethylene glycol methacrylate having an average molecular weight of 475. The use amount of the other radically polymerizable monomers is suitably 20 to 90% by weight, particularly 40 to 80% by weight based on the weight of the whole coating agents. The use amount of the amine compound, such as triethanolamine, N-methyldiethanolamine, triisopropanolamine, N,N-dimethylaminoethyl methacrylate or N,N-diethylaminoethyl methacrylate for example, is suitably 0.01 to 15% by weight, particularly 0.1 to 10% by weight based on the weight of the whole coating agents. The use amount of the photochromic compound such as a naphthopyran derivative, a chromene derivative, a spirooxazine derivative, a spiropyran derivative or a fulgimide derivative is suitably 0.1 to 30% by weight, particularly 1 to 10% by weight based on the weight of the whole coating agents.

In case the spectacle lens comprises at least one photochromic coating, typically the front surface of the spectacle lens, typically corrective lens, comprising the at least one photochromic coating, the spectacle lens, typically corrective lens, may optionally comprise at least one photochromic primer. Typically the front surface of the spectacle lens, typically corrective lens, comprises the at least one photochromic primer and the at least one photochromic coating, the photochromic coating being the outermost coating thereof. The at least one photochromic primer may comprise the polyurethane resin layer disclosed in EP 1 602 479 A1, in particular in EP 1 602 479 A1, claim 1, or the primer layer disclosed in WO 03/058300 A1, in particular in WO 03/058300 A1, page 22, line 3 to page 23, line 13.

The at least one medium able to modify the at least one coating typically is at least one organic acid. The at least one medium typically comprises at least one organic aliphatic saturated or unsaturated, optionally substituted, monocarboxylic acid. The at least one medium typically comprises at least one organic aliphatic saturated or unsaturated monocarboxylic acid comprising 2 to 22 carbon atoms, typically 3 to 18 carbon atoms. As at least one medium acetic acid, propionic acid, acrylic acid, lactic acid, butyric acid, isobutyric acid, valeric acid, heptanoic acid, caproic acid, caprylic acid, pelargonic acid, myristoleic acid, palmitoleic acid, linoleic acid, alpha linolenic acid, gamma linolenic acid, oleic acid, ricinoleic acid, stearidonic acid, arachidonic acid, eicosapentaenoic acid, docosapentaenoic acid and/or docosahexaenoic acid may be used, for example. Typically, the at least one medium comprises at least one acid selected from the group consisting of acetic acid, lactic acid, butyric acid, caproic acid, caprylic acid, pelargonic acid, linoleic acid, alpha linolenic acid, gamma linolenic acid and oleic acid. More typically, the at least one medium comprises at least one acid selected from the group consisting of lactic acid, caprylic acid and oleic acid. Alternatively or additionally, the at least one medium may comprise a tricarboxylic acid such as citric acid for example or an inorganic acid such as hydrochloric acid for example. As at least one medium one of the before mentioned or any combination thereof may be used. The at least one medium may be used in commercially available grade or commercially available quality or the at least one medium may be used diluted or the at least one medium may be used in different concentrations. In case the at least one medium is applied via ink jet printing the viscosity of the at least one medium may have to be adjusted for being printable. Further, in case the at least one medium is applied via ink jet printing, in addition to for example the at least one specific position and/or the at least one specific region the at least one medium is to be applied and/or to a variation of the parameters for the at least one single electromagnetic pulse to be applied and/or to a variation in the total process duration the ink comprising the at least one medium may be variable as well, for example with respect to the concentration of the at least one medium and/or by the addition of at least one additive. So, a large variety of achievable surface modifications is possible considering all the possibilities for the before mentioned variations. To even further extend the variety of achievable surface modifications, the surface of the at least one coating to be modified by the at least one medium may be activated, for example by an alkaline solution. Such an activation may influence at least the dimension, the shape and/or the contact angle of the ink jet printing ink, typically after coalescence thereof as a drop, on the surface of the at least one coating. Thus in turn influences at least the dimension and/or the shape of resulting surface modification after the application of the at least one single electromagnetic pulse.

The at least one medium able to modify the at least one coating typically is only temporarily in contact with the at least one coating. The at least one medium is either (i) removed by the application of at least one single electromagnetic pulse or by the application of single electromagnetic pulses or (ii) is removed after the at application of at least one single electromagnetic pulse or after the application of single electromagnetic pulses, e.g., by simply wiping or rinsing off. So the at least one medium is not to remain as additional material or coating on the at least one coating.

The surface modification of the at least one coating modifiable when contacted or having been contacted with at least one medium able to modify the at least one coating, typically the diffusion controlled swelling accelerated by the application of at least one single electromagnetic pulse, comprises at least one modification resulting in at least one micro lens or lenslet of any arbitrary form or shape as well as the modification of the whole surface of the at least one coating resulting in a desired final optical surface. The modification of the whole surface of the at least one coating to obtain at least one of the final optical surfaces of the spectacle lens may replace conventional methods such as a grinding and polishing process. This in turn means a paradigm shift in the manufacturing of spectacle lenses.

In case of a local surface modification of the at least one coating the resulting micro lens or lenslet may have a height in the range of typically 1 nm to 10 µm, further typically 2 nm to 9 µm, further typically 3 nm to 8 µm, more typically in the range of 4 nm to 7 µm and most typically in the range of 5 nm to 6 µm. For a local surface modification comprising a complex shape the before mentioned ranges typically apply for the maximum height. With respect to the lateral extension, the width, typically a range of 5 µm to 20 mm, further typically of 10 µm to 10 mm, further typically of 20 µm to 5 mm, more typically of 50 µm to 4 mm and most typically of 70 µm to 3 mm may be given. The dimensions are typically determined by a white light interferometer system.

With respect to the achievable surface power of a local surface modification resulting in a micro lens or lenslet a large range is adjustable by the large variety of modification possibilities mentioned before. The surface power may be in a range of 0.2 diopters to 50 diopters, and is typically is a range of 0.25 diopters to 40 diopters, further typically in a range of 0.3 diopters to 30 diopters, more typically in a range of 0.4 diopters to 20 diopters and most typically in a range of 0.5 diopters to 10 diopters. The surface power may be calculated as explained in EP 3 812 142 A1.

The at least one coating modifiable with at least one medium, the surface modification caused by the at least one medium able to be significantly accelerated by the application of at least one single electromagnetic pulse, is typically at least one coating that is cured and/or hardened and not only dried or precured.

The spectacle lens comprising the at least one coating being modifiable when contacted with at least one medium may further comprise at least one further coating, the at least one coating being the outermost coating thereof. Typically, the at least one further coating is applied after the surface modification is done. The at least one further coating typically does not destroy or damage the surface modification of the at least one coating. The at least one further coating typically is at least one primer coating and/or at least one hard coating based on a coating composition, typically able to be dried and cured and/or hardened by the application of at least one single electromagnetic pulse as disclosed for example in EP 20182515.5. The at least one hard coating may be based on at least one of the hard coating compositions disclosed in U.S. 2005/0171231 A1, in U.S. 2009/0189303 A1 or in U.S. 2002/0111390 A1. Alternatively, the at least one hard coating may be based on the abrasion resistant coating composition disclosed in WO 2007/070976 A1. The at least one hard coating typically is based on at least one hard coating composition disclosed in EP 2 578 649 A1, particularly in EP 2 578 649 A1, claim 1. The at least one hard coating composition configured to produce the at least one hard coating typically comprises A) a) at least one silane derivative of the formula (I) $Si(OR^1)(OR^2)(OR^3)(OR^4)$, wherein $R^1$, $R^2$, $R^3$ and $R^4$, which may be the same or different, are selected from an alkyl, an acyl, an alkyleneacyl, a cycloalkyl, an aryl or an alkylenearyl group, each of which may optionally be substituted, and/or
  b) at least one hydrolysis product of the at least one silane derivative of the formula (I), and/or
  c) at least one condensation product of the at least one silane derivative of the formula (I), and/or
  d) any mixture of the components a) to c) thereof;
B) a) at least one silane derivative of the formula (II) $R^6R^7_{3-n}Si(OR^5)_n$, in which $R^5$ is selected from an alkyl, an acyl, an alkyleneacyl, a cycloalkyl, an aryl or an alkylenearyl group, each of which may optionally be substituted, $R^6$ is an organic radical containing at least one epoxide group, $R^7$ is selected from an alkyl, a cycloalkyl, an aryl or an alkylenearyl group, each of which may optionally be substituted, n is 2 or 3; and/or
  b) at least one hydrolysis product of the at least one silane derivative of the formula (II), and/or
  c) at least one condensation product of the at least one silane derivative of the formula (II), and/or any mixture of the components a) to c) thereof;
C) at least one colloidal inorganic oxide, hydroxide, oxide hydrate, fluoride and/or oxyfluoride;
D) at least one epoxide compound having at least two epoxide groups; and
E) at least one catalyst system comprising at least one Lewis acid and at least one thermolatent Lewis acid-base adduct.

Alternatively or additionally to the before mentioned at least one hard coating composition resulting in at least one hard coating, the at least one hard coating is typically based on at least one hard coating composition comprising
  A) a) at least one silane derivative of the formula (III) $R^1R^2_{3-n}Si(OR^3)_n$, wherein $R^1$ comprises an alkyl group, a cyclo alkyl group, an acyl group, an aryl group or a hetero aryl group, each of which may be substituted, $R^2$ is an organic rest comprising an epoxide group, $R^3$ comprises an alkyl group, a cyclo alkyl group, an aryl group or a hetero aryl group, each of which may be substituted, n=2 or 3, and/or
    b) at least one hydrolysis product of the silane derivative of the formula (III), and/or
    c) at least one condensation product of the silane derivative of the formula (III), and/or
    d) any mixture of components a) to c);
  B) at least one colloidal inorganic oxide, hydroxide, oxide hydrate, fluoride and/or oxyfluoride;
  C) at least one epoxy component comprising at least two epoxy groups; and
  D) at least one catalyst system comprising at least one Lewis acid and at least one thermolatent Lewis base-adduct.

The spectacle lens may comprise the before mentioned at least one further coating either i) directly adjacent to the at least one coating being modifiable when contacted with at least one medium or having been contacted with at least one medium or ii) a surface of the spectacle lens not comprising the at least one coating being modifiable when contacted with at least one medium or having been contacted with at least one medium comprises the at least one further coating. A surface of the spectacle lens not comprising the at least one coating being modifiable when contacted with at least one medium or having been contacted with at least one medium may be the edge surface of an edged lens, the front surface of an uncoated or precoated lens substrate or the back surface of an uncoated of precoated lens substrate.

The lens substrate typically is based on an optical material, the optical material being defined according to section 3.3.1 of DIN EN ISO 13666:2019-12 as transparent material capable of being manufactured into optical components. The spectacle lens substrate may be made of mineral glass according to section 3.3.1 of DIN EN ISO 13666:2019-12 and/or of an organic hard resin such as a thermosetting hard resin according to section 3.3.3 of DIN EN ISO 13666:2019-12; a thermoplastic hard resin according to section 3.3.4 of DIN EN ISO 13666:2019-12; or a photochromic material according to section 3.3.5 of DIN EN ISO 13666:2019-12.

Typically, the spectacle lens substrate is based on at least one of the optical materials mentioned in the following table, particularly typical on at least one of the organic hard resins.

TABLE

Examples of optical materials

| Trade name | Optical material | Average refractive index $n_D$* | Abbe number $v_D$* |
|---|---|---|---|
| CR-39, CR-330, CR-607, CR-630, RAV 700, RAV 7NG, RAV 7AT, RAV 710, RAV 713, RAV 720 | Polyallyldiglycol carbonate ((P)ADC) | 1.500 | 56 |
| RAVolution | Polyurea/Polyurethane | 1.500 | 54 |
| Trivex | Polyurea/Polyurethane | 1.530 | 45 |
| Panlite, Lexan, Makrolon | Polycarbonate (PC) | 1.590 | 29 |
| MR-6 | Polythiourethane | 1.598 | |
| MR-8 | Polythiourethane | 1.598 | 41 |
| MR-7 | Polythiourethane | 1.664 | 32 |
| MR-10 | Polythiourethane | 1.666 | 32 |
| MR-174 | Polyepisulfide | 1.738 | 32 |
| MGC 1.76 | Polyepisulfide | 1.76 | 30 |
| Spectralite | Urethane/Methacrylate | 1.54 | |
| | Mineral 1.5 | 1.525 | 58 |
| | Mineral 1.6 | 1.604 | 44 |
| | Mineral 1.7 | 1.701 | 39.2 |
| | Mineral 1.8 | 1.802 | 34.4 |
| | Mineral 1.9 | 1.885 | 30 |

*Based on sodium D line

Summarizing, the exemplary embodiments according to the following clauses are particularly typical within the scope of the present disclosure:

Clause 1: Method of manufacturing a spectacle lens comprising a lens substrate and at least one coating, the method comprising the following steps in the given order:
  Providing a lens substrate comprising an uncoated or precoated front surface and an uncoated or precoated back surface,
  Covering at least one surface of the lens substrate with at least one coating being modifiable by contacting with at least one medium able to modify the at least one coating,
  Contacting, completely or partially, the outermost surface of the at least one coating, i.e., the surface of the at least one coating not adjacent to one of the surfaces of the lens substrate, with at the least one medium,
  Applying at least one single electromagnetic pulse to at least one surface of a spectacle lens comprising the lens substrate, the at least one coating and the at least one medium,
  Obtaining a spectacle lens comprising the lens substrate and the at least one coating, the surface of the at least one coating being completely or partially modified.

Clause 2: Method according to clause 1, wherein the surface topography of the at least one coating is completely or partially modified.

Clause 3: Method according to any one of the preceding clauses, wherein the modification of the surface topography of the at least one coating is at least one elevation of the at least one coating.

Clause 4: Method according to any one of the preceding clauses, wherein the modification of the surface topography of the at least one coating is a diffusion-controlled process of the at least one coating, typically a diffusion-controlled swelling process of the at least one coating.

Clause 5: Method according to any one of the preceding clauses, wherein the at least one coating is cured and/or hardened, before the at least one coating is contacted with the least one medium and before the at least one electromagnetic pulse is applied to at least one of the surfaces of a spectacle lens comprising the lens substrate, the at least one coating and the at least one medium in contact with the at least one coating.

Clause 6: Method according to any one of the preceding clauses, wherein a complete modification of the surface topography of the at least one coating is adjustable as the final optical surface of the spectacle lens.

Clause 7: Method according to any one of the preceding clauses, wherein a complete modification of the surface topography of the at least one coating is correcting or compensating a wearer's prescribed refractive power, typically for foveal vision.

Clause 8: Method according to any one of the preceding clauses, wherein a partial modification of the surface topography of the at least one coating results in at least one local swelling of the at least one coating, typically not impairing foveal vision.

Clause 9: Method according to any one of the preceding clauses, wherein a complete modification of the surface topography of the at least one coating is followed by at least one partial modification of the surface topography of the at least one coating, typically comprising the following steps in the given order:
  Partially covering or partially contacting the modified surface of the at least one coating with at least one medium, typically at least one specific position and/or at least one specific region,
  Applying at least one single electromagnetic pulse to at least one of the surfaces of a spectacle lens comprising the lens substrate, the at least one coating and the at least one medium,
  Obtaining a spectacle lens comprising a lens substrate and at least one coating, the surface topography of the at least one coating being partially modified, typically comprising at least one micro lens.

Clause 10: Method according to any one of the preceding clauses, wherein the spectacle lens is further coated with at least one coating selected from at least one of the group consisting of at least one hard coating, at least one anti-reflective coating and at least one clean coating.

Clause 11: Method according to any one of the preceding clauses, wherein after the application of the at least one single electromagnetic pulse the residual at least one medium is wiped off the modified surface of the at least one coating.

Clause 12: Method according to any one of the preceding clauses, wherein the modification of the surface topography of the at least one coating is adjustable or tunable depending at least on the at least one single electromagnetic pulse applied.

Clause 13: A product comprising:
  i) A spectacle lens, or
  ii) a spectacle lens and instructions to use a spectacle lens, or
  iii) a virtual representation of the spectacle lens, the representation being stored on a non-transitory data medium and/or a data signal, or
  iv) a virtual representation of the spectacle lens and virtual instructions to use the spectacle lens, the representation and the instructions being stored on a non-transitory data medium, or
  v) a non-transitory data medium with a virtual representation of the spectacle lens and optionally virtual instructions to use the spectacle lens, or
  vi) a data signal with a virtual representation of the spectacle lens and optionally virtual instructions to use the spectacle lens,
the spectacle lens comprising a lens substrate, the lens substrate comprising an uncoated or precoated front surface and an uncoated or precoated back surface,
at least one the surfaces of the lens substrate being coated with at least one coating, the at least one coating being modifiable when contacted with at least one medium to obtain any targeted final optical surface.

In the following the disclosure is described in more detail by means of the examples, without being restricted to the examples:

I Manufacture of Spectacle Lenses Comprising Micro Lenses or Lenslets According to the Examples and Comparative Examples

Example 1

An uncoated optical lens substrate based on thiourethane (MR8, Mitsui Resin, diameter: 75 mm), coated and cured on one surface (front surface) with a photochromic coating (Photofusion, without any further coating and without the photochromic dyes, Carl Zeiss Vision), was first activated in an alkali solution bath (composed of 10% NaOH) and rinsed repeatedly in deionized water bath. After drying, the surface free energy of the substrate was measured as of 55.4 mN/m. The front surface was then printed with an ink composed of oleic acid and 0.2 wt. % SF 1188A as surfactant, using Fujifilm Dimatrix 2850 inkjet printer, equipped with DMC printhead of 10 pL drop volume. The front surface was printed with 254 dpi and repeated for 50 times (50 drops). Following this, the front surface with the defined ink drops was exposed to an electromagnetic pulse train consisting of 160 electromagnetic pulses within a total process duration of 107 seconds in ambient air. The wavelength of each single electromagnetic pulse was between 200 nm to 1000 nm. Each of 160 electromagnetic pulses delivered a dose of 5.35 $J/cm^2$. Each of the 160 electromagnetic pulses were divided into 8 micro-pulses at an average duty-cycle of 30%. The envelope of each of the 160 electromagnetic pulses was 225 ms. The exposure induced the swelling of beneath photochromic coating and formed lenslets, and the remaining printed ink was wiped off from the lens surface before further rinsing the lens surface with isopropanol solvent.

Example 2

An uncoated optical lens substrate based on MR8 (diameter: 75 mm), coated and cured on one surface (front surface) with the same photochromic coating as in example 1, was first activated in an alkali solution bath (composed of 10% NaOH) and rinsed repeatedly in deionized water bath. After drying, the surface free energy of the substrate was measured as of 55.4 mN/m. The front surface was printed with 254 dpi and repeated for 30 times (30 drops).

Example 3

An uncoated optical lens substrate based on MR8 (diameter: 75 mm), coated and cured on one surface (front surface) with the same photochromic coating as in example 1, was only manually cleaned with isopropanol solvent and the measured surface free energy of 46.4 mN/m. The front surface was then printed with the ink composing of oleic acid and 0.2 wt. % SF 1188A as surfactant, using Fujifilm Dimatrix 2850 inkjet printer, equipped with DMC printhead of 10 pL drop volume. The front surface was printed with 254 dpi and repeated for 30 times (30 drops).

Example 4-7

Uncoated optical lens substrates based on MR8 (diameter: 75 mm), coated and cured on one surface (front surface) with the same photochromic coating as in example 1, were first activated in an alkali solution bath (composed of 10% NaOH) and rinsed repeatedly in deionized water bath. The front surfaces of these lenses were then printed with inks based on oleic acid, but modified with different surfactants, as shown in table 3. The inks were deposited on the lens surfaces using Fujifilm Dimatrix 2850 inkjet printer, equipped with DMC printhead of 10 pL drop volume. The front surfaces of examples 4-7 were printed with 254 dpi and repeated for 30 times (30 drops).

Example 8-10

An uncoated optical lens substrate based on MR8 (diameter: 75 mm), coated and cured on one surface (front surface) with the same photochromic coating as in example 1, was first activated in an alkali solution bath (composed of 10% NaOH) and rinsed repeatedly in deionized water bath. After drying, the surface free energy of the substrate was measured as of 55.4 mN/m. The front surface was then printed with an ink composed of oleic acid and 0.5 wt. % SF 1188A as surfactant, using the Süssmicrotec Pixdro inkjet printer, equipped with Fujifilm Spectra S class printhead of 80 pL drop volume. The front surfaces of examples 8-10 were printed with 972 dpi. Following this, the front surfaces with the defined ink drops was exposed to different electromagnetic pulses. The lens in example 8 was exposed to electromagnetic pulse train consisting of 160 electromagnetic pulses within a total process duration of 80 seconds in ambient air at a 2 Hz repetition rate. The wavelength of each single electromagnetic pulse was between 200 nm to 1000 nm. Each of the 160 electromagnetic pulses delivered a dose of 5.35 J/cm$^2$. Each of the 160 electromagnetic pulses were divided into 8 micro-pulses at an average duty-cycle of 30%. The envelope of each of the 160 electromagnetic pulses was 225 ms. The lens in example 9 was exposed to electromagnetic pulse train consisting of 160 electromagnetic pulses within a total process duration of 107 seconds in ambient air at a 1.5 Hz repetition rate. The wavelength of each single electromagnetic pulse was between 200 nm to 1000 nm. Each of 160 electromagnetic pulses delivered a dose of 5.35 J/cm$^2$. Each of the 160 electromagnetic pulses were divided into 8 micro-pulses at an average duty-cycle of 30%. The envelope of each of the 160 electromagnetic pulses was 225 ms. The lens in example 10 was exposed to electromagnetic pulse train consisting of 100 electromagnetic pulses within a total process duration of 320 seconds in ambient air. The wavelength of each single electromagnetic pulse was between 200 nm to 1000 nm. Each of 160 electromagnetic pulses delivered a dose of 5.35 J/cm$^2$. Each of the 160 electromagnetic pulses were divided into 8 micro-pulses at an average duty-cycle of 30%. The envelope of each of the 160 electromagnetic pulses was 225 ms. The exposures in examples 8-10 induced the swelling of beneath photochromic coating and formed lenslets, and the remaining printed ink was wiped off from the lens surface before further rinsing the lens surface with isopropanol solvent.

Example 11

An uncoated optical lens substrate based on MR8 (diameter: 75 mm), coated and cured on one surface (front surface) with the same photochromic coating as in example 1, was first activated in an alkali solution bath (composed of 10% NaOH) and rinsed repeatedly in deionized water bath. After drying, the surface free energy of the substrate was measured as of 55.4 mN/m. The front surface was then printed with an ink composing of oleic acid and 0.2 wt. % SF 1188A as surfactant, using Fujifilm Dimatrix 2850 inkjet printer, equipped with DMC printhead of 10 pL drop volume. The front surface was printed with 254 dpi and repeated for 50 times (50 drops). Following this, the front surface with the defined ink drops was exposed to varying electromagnetic pulse trains from top to bottom. On the top, the electromagnetic pulse train consisted of 80 electromagnetic pulses within a total process duration of 53 seconds in ambient air. On the centre, the electromagnetic pulse train consisted of 60 electromagnetic pulses within a total process duration of 40 seconds in ambient air. At the bottom, the electromagnetic pulse train consisted of 40 electromagnetic pulses within a total process duration of 27 seconds in ambient air. The wavelength of each single electromagnetic pulse was between 200 nm to 1000 nm. Each of these electromagnetic pulses delivered a dose of 5.35 J/cm$^2$. Each of these electromagnetic pulses were divided into 8 micro-pulses at an average duty-cycle of 30%. The envelope of each of the 160 electromagnetic pulses was 225 ms. The exposure induced the swelling of beneath photochromic coating and formed lenslets, and the remaining printed ink was wiped off from the lens surface before further rinsing the lens surface with isopropanol solvent.

Example 12

An uncoated optical lens substrate based on MR8 (diameter: 75 mm), coated and cured on one surface (front surface) with the photochromic coating (Photofusion Grey, without any further coating, Carl Zeiss Vision), was first activated in an alkali solution bath (composed of 10% NaOH) and rinsed repeatedly in deionized water bath. After drying, the surface free energy of the substrate was measured as of 55.4 mN/m. The front surface was then printed with an ink composing of oleic acid and 0.2 wt. % SF 1188A as surfactant, using Fujifilm Dimatrix 2850 inkjet printer, equipped with DMC printhead of 10 pL drop volume. The front surface was printed with 254 dpi and repeated for 50 times (50 drops). Following this, the front surface with the defined ink drops was exposed to an electromagnetic pulse train consisting of 120 electromagnetic pulses within a total process duration of 90 seconds in ambient air. The wavelength of each single electromagnetic pulse was between 200 nm to 1000 nm. Each of 120 electromagnetic pulses delivered a dose of 8.45 J/cm$^2$. Each of the 120 electromagnetic pulses were divided into 12 micro-pulses at an average duty-cycle of 14%. The envelope of each of the 120 electromagnetic pulses was 125 ms. The exposure induced the swelling of beneath photochromic coating and formed lenslets, and the remaining printed ink was wiped off from the lens surface before further rinsing the lens surface with isopropanol solvent.

Example 13

The coated lens of example 1 was further coated on both surfaces with the primer composition according to example 1 of U.S. Pat. No. 5,316,791 and then with the hard coating composition according to example 2 of EP 2 578 649 A1. The so obtained coated lens was first dried with an IR lamp for 5 minutes at 70° C. in ambient air. Subsequently, the front surface was exposed to an electromagnetic pulse train consisting of 60 electromagnetic pulses within a total process duration of 42 seconds in ambient air. The wavelength of each single electromagnetic pulse was between 200 nm to 1000 nm. Each of the 60 electromagnetic pulses delivered a dose of 5.8 J/cm$^2$. Each of the 60 electromagnetic pulses were divided into 12 micro-pulses at an average duty-cycle of 14%. The envelope of each of the 60 electromagnetic pulses was 126 ms.

Comparative Example 1

An uncoated optical lens substrate based on MR8 (diameter: 75 mm), coated and cured on one surface (front surface) with the same photochromic coating as in example 1, was first activated in an alkali solution bath (composed of 10% NaOH) and rinsed repeatedly in deionized water bath. After drying, the surface free energy of the substrate was measured as of 55.4 mN/m. The front surface was then printed with an ink composing of oleic acid and 0.2 wt. % SF 1188A as surfactant, using Fujifilm Dimatrix 2850 inkjet printer, equipped with DMC printhead of 10 pL drop volume. The front surface was printed with 254 dpi and repeated for 50 times (50 drops). Following this, lens was kept in the suntester Suntest XLS+ (Atlas Material Testing Technology GmbH) equipped with a Xenon lamp of energy density of 765 mW/cm$^2$ for 20 hours that induces the swelling to form lenslets of the required dimensions.

II Characterization and Results of the Spectacle Lenses Comprising the Micro Lenses or Lenslets According to the Examples and Comparative Examples IIa: determination of the shape and dimensions of printed ink and lenslets The shape and dimensions of the of printed ink and lenslets has been determined by the white light interferometer system called 3D Optical Surface Profiler NewView 7100 from Zygo company.

IIb: reduction of the total process duration

Comparing the shape and dimensions of the lenslets formed in example 1 with the lenslets formed in comparative example 1, in particular with width and height, similar lenslets possessing 3D gaussian profile could already be obtained in 106 seconds when swelling with electromagnetic pulse train (example 1), instead of 20 hours when swelling using suntester equipped with Xenon lamp (comparative example 1, Table 1). This is a 99.85% reduction in the total process duration for swelling.

TABLE 1

Comparison of lenslets dimensions and process duration between example 1 and comparative example 1.

| | Dimensions | | Total swelling process |
|---|---|---|---|
| | Height | Width | duration |
| Example 1 | 803 nm | 502 μm | 106 sec |
| Comparative Example 1 | 805 nm | 496 μm | 20 hours |

IIc: Effect of surface free energy variation of substrates on the wetting behaviour of printed drops of oleic acid (example 2 and 3)

Example 2 and 3 demonstrate the effect of substrate activation to achieve droplets that allow a more 3D gaussian profile of the eventual lenslets after swelling (Table 2). The way of activation of lens, which influence the surface free energy of photochromic coating, allows tuning the dimensions and the wetting behavior on the printed drops. This has consequences on the dimensions of the lenslets formed after the swelling.

TABLE 2

Comparison of examples 2 and 3.

| Samples | 30 drops-oleic acid | Surface energy | Droplet diameter | Droplet height | Contact angle |
|---|---|---|---|---|---|
| Example 2 | Non activated lens | 46.4 mN/m | 155 μm | 13.5 μm | 19.2° |
| Example 3 | Activated lens | 55.4 mN/m | 212 μm | 10.7 μm | 11.8 |

IId: Influence of ink formulation on printing of lenslets (example of 4-7)

Example 4, 5, 6, 7 demonstrate the effect of surfactants in the ink formulation in modifying the droplets spreading behavior on activated lens substrates of MR8 coated with photochromic coating without photochromic dyes. Clearly, comparing with pure oleic acid, a certain amount of surfactant can be helpful in achieving a larger diameter of printed drops, which would further lead to a larger lenslet after swelling.

TABLE 3

Comparison of printed drops from examples 4, 5, 6 and 7.

| Samples | 10 pL, 30 drops | Droplet diameter | Droplet height | Contact angle |
|---|---|---|---|---|
| Example 4 | Pure Oleic acid | 210 μm | 10.8 μm | 11.8° |
| Example 5 | 0.2 wt. % SF 1188A | 265 μm | 4.8 μm | 4.6° |
| Example 6 | 0.2 wt. % BYK 133 | 230 μm | 7.1 μm | 7.0° |
| Example 7 | 2.0 wt. % SF 1188A | 305 μm | 4.0 μm | 3.4° |

IIe: Influence of electromagnetic pulse on the shape of lenslets

Example 8-10 demonstrate the influence of the electromagnetic pulse train on the outcome of the shape of the lenslets. The overall total energy received by the lens in example 8, 9 and 10 and the architecture of individual electromagnetic pulses in the electromagnetic pulse train is the same. There is variation in the repetition rate of the individual electromagnetic pulses within the electromagnetic pulse train. This affects the total duration of the exposure without increasing the total energy delivered to each lens. The resulted height and width, therefore, in example 8-10 is rather close with each other, but the shape of the resulted lenslet is vastly different. Volcano-shape lenslets (flat top with crater) are obtained in example 8 with 80 second total exposure duration, the required 3D Gaussian shape lenslets are obtained in example 9 with 107 second total exposure duration and rounded flat top shaped lenslets are obtained in example 10 with 320 second total exposure duration. Higher repetition rate of 2 Hz in example 8 corresponds to faster exposure delivering the same number of individual electromagnetic pulses as in compared to example 9 with 1.5 Hz repetition rate and example 10 with 0.5 Hz repetition rate. An optimal exposure condition is obtained in example 9 that result in a 3D gaussian shaped lenslets.

TABLE 4

| Samples | shape | Lenslets diameter | Lenslet height |
|---|---|---|---|
| Example 8 | volcano-like top | 960 μm | 855 nm |
| Example 9 | 3D gaussian | 1064 μm | 1020 nm |
| Example 10 | rounded flat top | 1120 μm | 1080 nm |

The respective lenslet shapes and surface profiles are shown in the FIGURE.

IIe: Influence of electromagnetic pulse on the height of lenslets

Example 11 demonstrate the influence of the electromagnetic pulse train on the outcome of the height of the lenslets. This also demonstrates that height variation can be achieved on the same lens. The height of the lenslets on the upper part of the lens which received the largest total energy is 200 nm, on the middle part which received the intermediate total energy is 130 nm and on the lower part which received the smallest total energy is 80 nm. Swelling with electromagnetic pulse with varying dose on different regions of the same lenses creates a gradient of swelling height with constant width and thus a gradient of optical power.

IIf: Influence of electromagnetic pulse on the position of lenslets

The lenslets in example 12 show an uncontrolled random displacement of the printed inks resulting in with the application of high energy electromagnetic pulse train.

IIg: Overcoating lenslets with hard coating

The lenslets in example 13 undergo no damage or collapse after hard coating and post-curing with the electromagnetic pulse train.

The invention claimed is:

1. A method of manufacturing a spectacle lens, the spectacle lens having a lens substrate and at least one coating, the method comprising at least the following steps:
   providing a lens substrate having an uncoated or precoated front surface and an uncoated or precoated back surface;
   coating at least one surface of the lens substrate with at least one coating; and
   completely or partially contacting a surface of the at least one coating with at least one medium,
   wherein the method further comprises at least:
   applying at least one single electromagnetic pulse to at least one of the surfaces of the spectacle lens having the lens substrate, the at least one coating and the at least one medium;
   removing the at least one medium; and
   obtaining the spectacle lens having at least one coating with a completely or partially modified surface, the surface of the at least one coating being modifiable when in contact or having been in contact with the at least one medium, and the at least one medium being configured to modify the surface of the at least one coating.

2. The method according to claim 1, wherein the modification of the surface of the at least one coating is a modification of the surface topography of the at least one coating.

3. The method according to claim 1, wherein the modification of the surface of the at least one coating is a diffusion-controlled swelling of the at least one coating.

4. The method according to claim 1, wherein the completely or partially contacting of the surface of the at least one coating with the at least one medium is performed by printing the at least one medium on the surface of the at least one coating.

5. The method according to claim 1, wherein the at least one single electromagnetic pulse is applied to one surface of the spectacle lens having the lens substrate, the at least one coating, and the at least one medium.

6. The method according to claim 1, wherein the at least one coating is selected from at least one of the group consisting of at least one photochromic coating and at least one coating based on a coating composition for a photochromic coating but without a photochromic dye.

7. The method according to claim 1, wherein the surface of the at least one coating is activated or not activated before the contacting with the at least one medium.

8. The method according to claim 1, wherein the at least one medium comprises at least one organic aliphatic saturated or unsaturated, optionally substituted, monocarboxylic acid.

9. The method according to claim 1, wherein the complete modification of the surface of the at least one coating results in a final optical surface of the spectacle lens.

10. The method according to claim 1, wherein the partial modification of the surface of the at least one coating results in a least one micro lens.

11. The method according to claim 1, wherein at least one further coating, selected from at least one of the group consisting of at least one hard coating, at least one anti-reflective coating, and at least one clean coating, is applied to the modified surface of the at least one coating.

12. The method according to claim 1, wherein the modification of the surface of the at least one coating is adjustable or tunable by at least the at least one single electromagnetic pulse applied.

13. The method according to claim 1, wherein a total process duration needed for modifying the at least one coating lies within a range from 100 μs to 7 min.

14. The method according to claim 1, wherein the at least one single electromagnetic pulse has an envelope in a range from 50 μs to 200 ms.

15. The method according to claim 1, wherein the at least one single electromagnetic pulse comprises light delivered by at least one electromagnetic source selected from the group consisting of at least one flash lamp, at least one halogen lamp, at least one directed plasma arc, at least one laser, at least one microwave generator, at least one induction heater, at least one electron beam, at least one stroboscope, and at least one mercury lamp.

16. The method according to claim 1, wherein the at least one single electromagnetic pulse has a wavelength in the range from 100 nm to 1800 nm.

17. The method according to claim 1, wherein the at least one medium is removed (i) by or (ii) after the application of at least one single electromagnetic pulse.

* * * * *